United States Patent [19]
Sato et al.

[11] Patent Number: 5,099,260
[45] Date of Patent: Mar. 24, 1992

[54] MULTIPLE IMAGE FORMING APPARATUS

[75] Inventors: Yukio Sato, Kawasaki; Masafumi Wataya; Hiroaki Ishii, both of Tokyo; Yutaka Udagawa, Kawasaki, all of Japan

[73] Assignee: Canon Kabushiki Kaisha, Tokyo, Japan

[21] Appl. No.: 686,880

[22] Filed: Apr. 17, 1991

Related U.S. Application Data

[60] Continuation of Ser. No. 497,715, Mar. 23, 1990, abandoned, which is a division of Ser. No. 370,077, Jun. 23, 1989, Pat. No. 4,931,815, which is a continuation of Ser. No. 307,232, Feb. 7, 1989, abandoned, which is a continuation of Ser. No. 38,308, Apr. 14, 1987, abandoned.

[30] Foreign Application Priority Data

Apr. 15, 1986 [JP] Japan .................. 61-085090
Apr. 15, 1986 [JP] Japan .................. 61-085091
Jun. 2, 1986 [JP] Japan .................. 61-127607

[51] Int. Cl.$^5$ .......................................... G01D 15/06
[52] U.S. Cl. ................................. 346/154; 346/157
[58] Field of Search ................ 358/78; 346/154, 157; 364/900

[56] References Cited

U.S. PATENT DOCUMENTS 4,531,828  7/1985  Hoshino ...................... 346/160
4,558,356 12/1985  Toda et al. ................ 346/157 X
4,688,190  8/1987  Bechtolsheim ............... 364/900

FOREIGN PATENT DOCUMENTS 0050481  4/1982  European Pat. Off. .
0079153  5/1983  European Pat. Off. .
0163791 12/1985  European Pat. Off. .
3318250 11/1984  Fed. Rep. of Germany .
2121644 12/1983  United Kingdom .

OTHER PUBLICATIONS

Tietze, V., et al., Halbleiter-Schaltungstechnik 5th Edit., Springer Verlag Berlin, Heidelberg, New York, 1980, pp. 701-703.

Primary Examiner—Donald Griffin
Attorney, Agent, or Firm—Fitzpatrick, Cella, Harper & Scinto

[57] ABSTRACT

There is disclosed an image forming apparatus for overlaying plural images in succession, in which a downstream image overlay is controlled in timing by an upstream image overlay, in order to avoid positional aberrations in the supperposed multiple images.

17 Claims, 25 Drawing Sheets

MULTIPLE IMAGE FORMING APPARATUS

This application is a continuation of application Ser. No. 07/497,715 filed Mar. 29, 1990, now abandoned, which was a division of application Ser. No. 07/370,077 filed June 23, 1989, now U.S. Pat. No. 4,931,815, issued June 5, 1990, which was a continuation of application Ser. No. 07/307,232, filed Feb. 7, 1989, now abandoned, which was a continuation of application Ser. No. 06/038,308 filed Apr. 14, 1987, now abandoned.

BACKGROUND OF THE INVENTION

1. Field of the Invention

The present invention relates to a multiple image forming apparatus for forming different images respectively on different recording members and transferring said images onto a same recording medium to obtain a multiple overlaid image.

2. Related Background Art

At first reference is made to FIG. 29 for explaining the function of a conventional color copying machine utilizing a single photosensitive drum.

In a main body 1200 of the one-drum color copying machine, there are provided a photosensitive drum 1201 rotated in a direction a, a charger 1202, a laser unit 1203, an exposure charger 1204, a surface potential sensor 1205, and color developing units 1206 for yellow, 1207 for magenta and 1208 for cyan.

The copying machines explained above functions in the following manner. The charger 1202 charges, by corona discharge, the surface of the rotating photosensitive drum 1201. A laser beam, emitted by the laser unit 1203, is projected onto the drum 1201 through mirrors. Said laser unit is provided with an unrepresented polygon mirror which is rotated to deflect the laser beam in the main scanning direction to form a main scanning line. Said laser beam is turned on and off to form an electrostatic latent image, in the form of pixels, on the surface of the photosensitive drum 1201. Subsequently the latent image is rendered visible by the deposition of color toner in one of the color developing units 1206, 1207, 1208. The obtained toner image is transferred, by means of a transfer charger 1209, onto a recording sheet 1210 supplied by a feed roller 1211 from a sheet cassette. A difference from a black-and-white copying machine lies in a fact that the sheet 1210 is supported on a support drum 1215 and rotated in a direction b. Said support drum 1215 is provided for transferring the toner images in the order of yellow, magenta and cyan onto the sheet 1210, and the peripheral speed of said drum is same as that of the photosensitive drum 1201.

After the transfer of three primary colors, the recording sheet is peeled off from the support drum 1215 and is transported to a heat fixing station 1214, and the sheet subjected to image fixation therein is discharged by a discharge roller 1213 to a copy tray 1212.

However, in terms of the copying speed, a system employing plural photosensitive drums as shown in FIG. 3 is more advantageous than the conventional structure shown in FIG. 29. Nevertheless the system with four photosensitive drums shown in FIG. 3 is still associated with problems to be solved, such as the registration of different color images, necessity for frame memories depending on the distance of the photosensitive drums, and correction for fluctuation in the sensitivity of plural photosensitive drums.

The aberration in the registration of different color images is evaluated by the observation with naked eyes, and the tolerance therefor is generally considered in the order of 100 μm.

However the control of said image registration becomes difficult if a sheet feed signal for a succeeding recording sheet is released before the start of image formation on the last photosensitive drum. For this reason the sheet feed signal for the next recording sheet is released after the start of image formation on the last photosensitive member, and high-speed printing cannot be achieved because of this fact.

SUMMARY OF THE INVENTION

An object of the present invention is to provide a multiple image forming apparatus or a color image forming apparatus not associated with the abovementioned drawbacks of the conventional technology.

Another object of the present invention is to provide a multiple image forming apparatus or a color image forming apparatus capable of providing a sharp image without aberration in the registration of different images, by forming different images respectively in different areas, measuring the aberrations of said images and controlling the write-in timings of said images.

Still another object of the present invention is to provide a multiple image forming apparatus or a color image forming apparatus in which a common reference frequency signal is supplied to the phase locked loop control circuits of plural rotary polygon mirrors for deflecting the laser beams, in order to achieve constant revolution thereof.

Still another object of the present invention is to provide a multiple image forming apparatus or a color image forming apparatus for transferring images from plural recording members onto a recording medium in succession, wherein a new recording medium can be supplied to an upstream recording member while a downstream recording member is in the course of image transfer.

Still another object of the present invention is to provide a multiple image forming apparatus or a color image forming apparatus, provided with means for prohibiting image formation when the aberration of image registration cannot be corrected.

Still another object of the present invention is to provide a multiple image forming apparatus or a color image forming apparatus in which plural detecting members for detecting the positional aberration in the image registration are mounted on a common reference member in order to improve the precision of detection.

Still another object of the present invention is to provide a multiple image forming apparatus or a color image forming apparatus in which plural light-emitting members for detecting the positional aberration in the image registration have a constant light intensity.

The foregoing and still other objects of the present invention, and the features and advantages thereof, will become fully apparent from the following description which is to be taken in conjunction with the attached drawings.

DETAILED DESCRIPTION OF THE PREFERRED EMBODIMENTS

Now the present invention will be clarified in detail by a color copying apparatus constituting an embodiment of the present invention. In the present text, the element technologies of said embodiment will be explained in the following order:

1. Outline of the apparatus
1-1. Block diagram
1-2. Structure of entire apparatus
1-3 Reader unit
1-4. Memory unit
1-5. Printer unit
2. Automatic correction of color registration
2-1. Algorism
2-2. Element technology
2-3. Timing of correction

[1. Outline of apparatus]

[1-1] Block diagram

Figure 1:
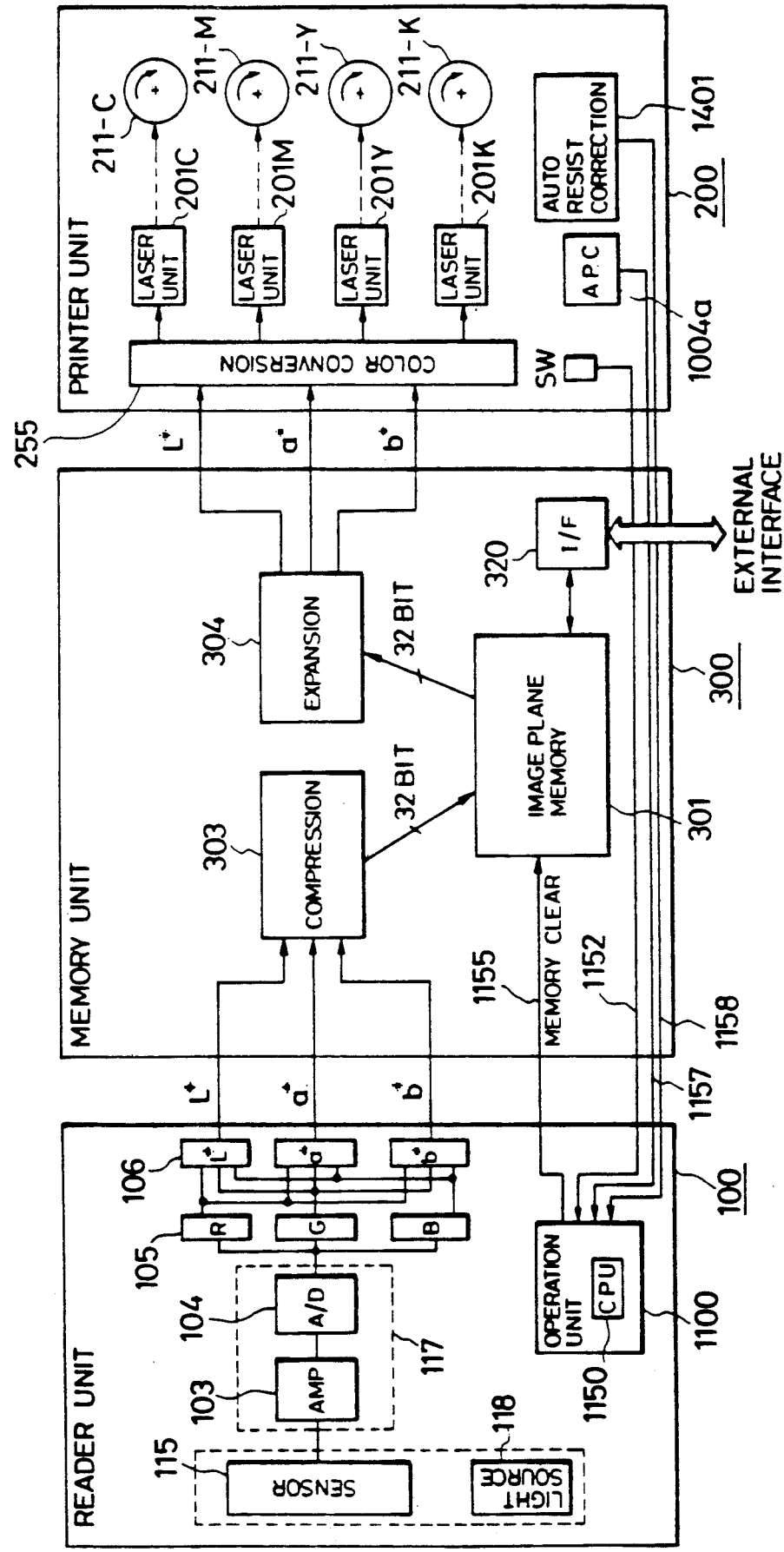
FIG. 1 is a block diagram of a digital color copying machine embodying the present invention.

FIG. 1 is a block diagram of the entire apparatus of the present embodiment, wherein a reader unit 100 is provided with an image reading sensor 115 and a light source 118 for illuminating the original image. An amplifier unit 103 amplifies the analog video signal from the sensor, and the obtained amplified analog video signal is supplied to an A/D converter 104. The sensor 115, composed of a CCD color sensor, releases signals of R(red), G(green) and B(blue) of a pixel in serial form. A latch circuit 105 latches said signals in the order of R, G and B, and then releases the signals R, G, B of a pixel at the same time. A color converting circuit 106 is composed of a look-up table utilizing for example a read-only memory (ROM) for obtaining signals L*, a* and b* from the signals R, G and B. In this manner the reader unit 100 releases the signals L*, a* and b*.

A memory unit 300 separately compresses the luminance signal L* and color signals a*, b*. Finally the image information of a predetermined number of pixels is compressed and stored in the frame memory or image plane memory 301. The image signals stored in the frame memory 301 are supplied, through a communication interface 320, to the outside or to a printer unit 200. In the latter case, the image signals stored in the memory 301 are decoded by an expander 304 to the original signal L*, a*, b* and supplied to the printer unit 200.

The printer unit 200 converts the image signals L*, a*, b* into image signals of C(cyan), M(magenta), Y(yellow) and K(black) corresponding to printing toners in a color conversion circuit 255 and supplies said signals in response to unsynchronized write timing signals from plural photosensitive members.

The present embodiment is provided with four laser units 201C, 201M, 201Y and 201K which respectively write the images of C, M, Y and K on photosensitive members 211C, 211M, 211Y, 211K which are formed as drums and positioned respectively corresponding to said laser units.

[1-2] Structure of entire apparatus

Figure 2:
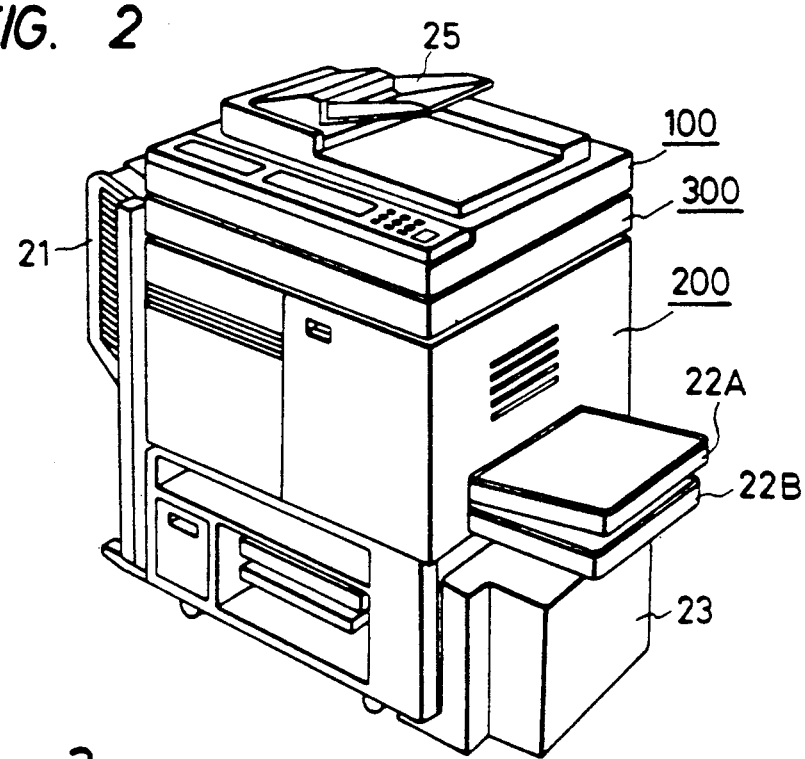
FIG. 2 is a perspective view of the digital color copying machine.

FIG. 2 is a perspective view of the entire digital color copying apparatus of the present embodiment, provided with the reader unit 100 for reading a color original, a memory unit 300 for storing compressed image signals, and a color printer unit 200 for forming a color image.

Also there are illustrated a sorter 21 for sorting the obtained color copies, an auto document feeder 25 for automatically feeding sheet originals, a paper deck 23 for storing and feeding a large amount of recording sheets, and sheet cassette 22A, 22B positioned in two stages.

Figure 3:
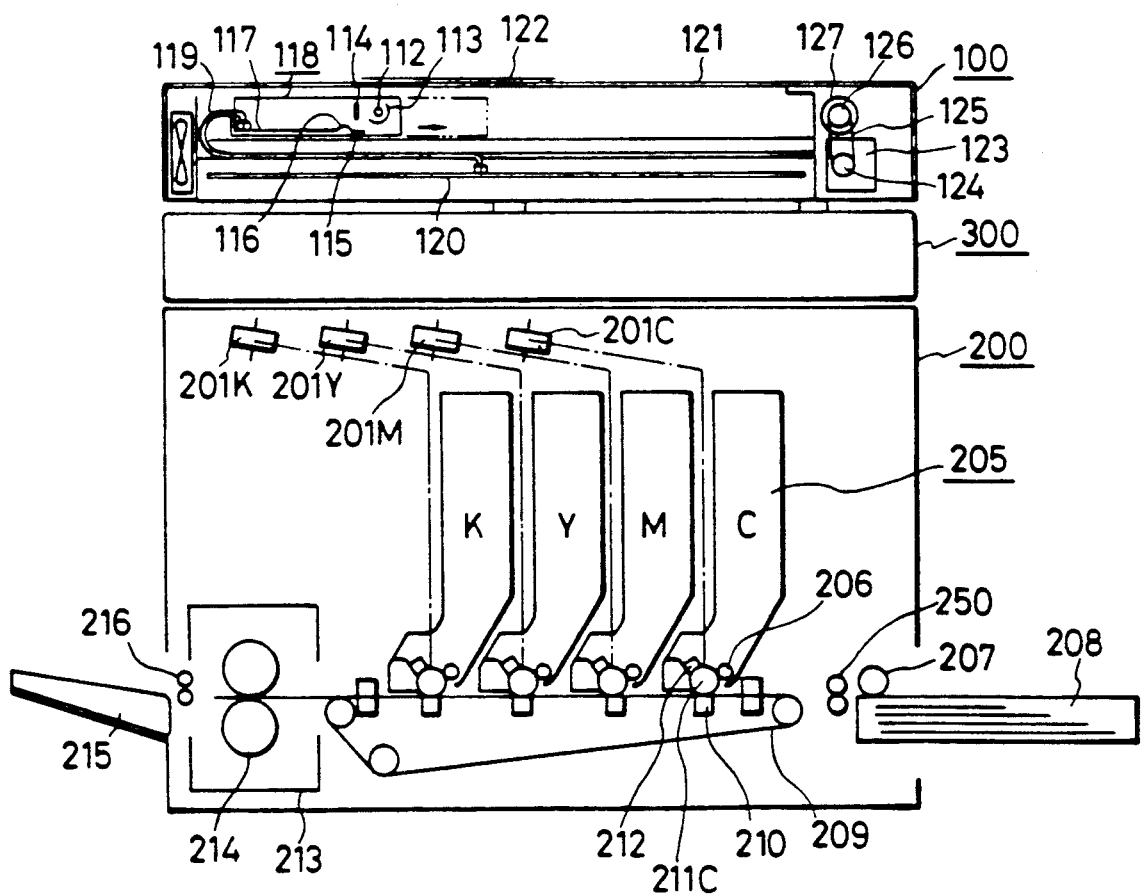
FIG. 3 is a cross-sectional view of the digital color copying machine.

FIG. 3 is a schematic cross-sectional view showing the internal structure of the apparatus of the present embodiment, which is abbreviated to show the basic function only, so that ancillary parts such as the sorter 21 and the paper deck 23 are omitted.

[1-3]Reader unit

Referring to FIG. 3, there are shown a light source 112 constituting an original illuminating lamp; a mirror 113; a rod lens array 114 for focusing the light reflected by an original 122 placed on a glass plate 121, onto the image reading sensor 115; a scanning member 118 supporting said original illuminating lamp 112, mirror 113, rod lens array 114, original reading sensor 115 and a circuit board 117 having an A/D conversion circuit for the image signal released by the sensor 115 through a signal line 116, and adapted to perform a linear motion in the direction indicated by an arrow integrally with said components 112–117; and a circuit board 120 having a process control circuit for storing and processing the image signal of a predetermined number of bits, 8 bits in the present embodiment, supplied from the A/D conversion circuit board 117 through a signal line 119.

Figure 4:
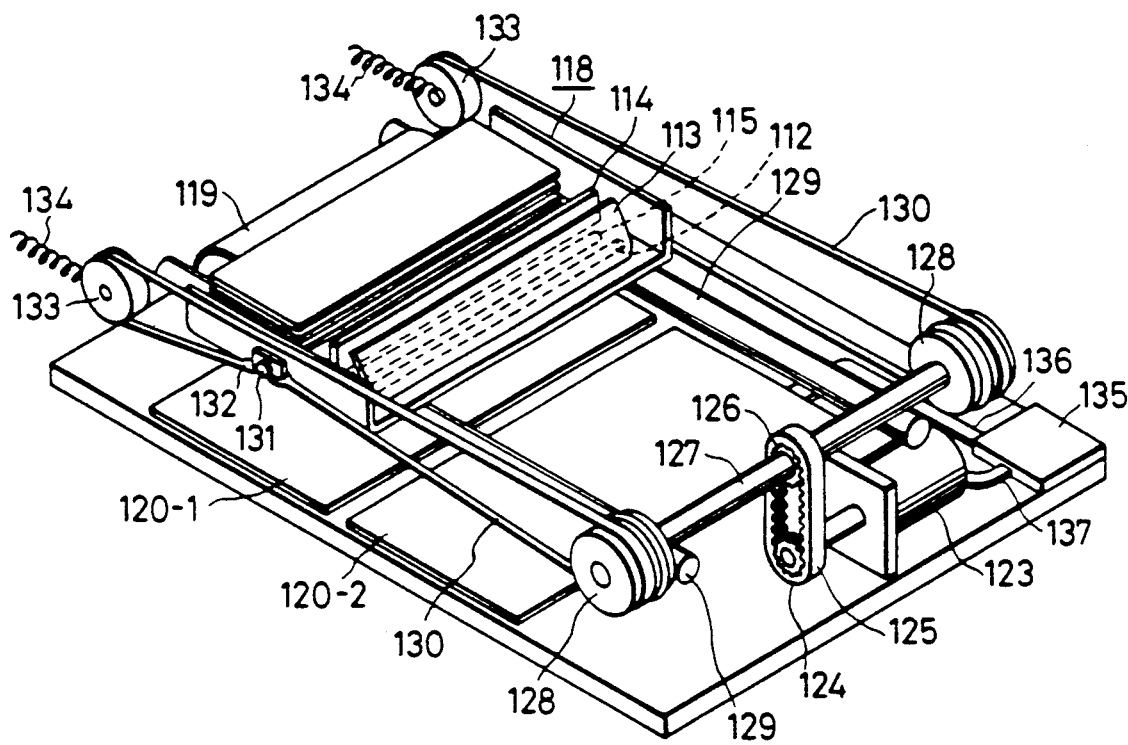
FIG. 4 is a perspective view of a reader unit.

FIG. 4 is a schematic view of the color image reader shown in FIG. 3, wherein same components as those in FIG. 3 are represented by same numbers. There are illustrated are a stepping motor 123 for driving the scanning member 118; a motor pulley 124 fixed on the shaft of said stepping motor 123; a belt 125 for transmitting the rotation of the motor 123 to a pulley 126 fixed on a shaft 127; a driving pulley 128 fixed on said shaft 127; two rails 129 slidably supporting the scanning member 118; a driving wire 130 which runs over the driving pulley 128 and an idler Pulley 133, biased by a spring 134 to give a tension to said wire, and is fixed on both sides of the scanning member 118 by means of a metal part 132 and a member 131; and a motor control circuit board 135 which is provided with a motor driver circuit for generating a signal for driving the stepping motor 123 in response to signals supplied from the process control circuit 120 through a signal line 136 and a pulse generating circuit for generating timing pulses for said drive signal and which is connected to the stepping motor 123 through a signal line 137.

The above-explained structure converts the rotation of the stepping motor 123, through the motor pulley 124, belt 125, pulley 126, shaft 127, driving pulley 128, wire 130, metal part 132 and member 131, into a linear movement of the scanning member 118 on the rails 129, and the direction of said linear movement is controlled by the forward or reverse rotation of said stepping motor 123.

The original image is read by the scanning motion, at a constant speed, of the image reading unit consisting of the lamp 112, mirror 113, rod lens array 114, image reading sensor 115 etc. moving integrally with the scanning member 118. The actual image reading operation is conducted from the front end position of the original image.

Figure 5:
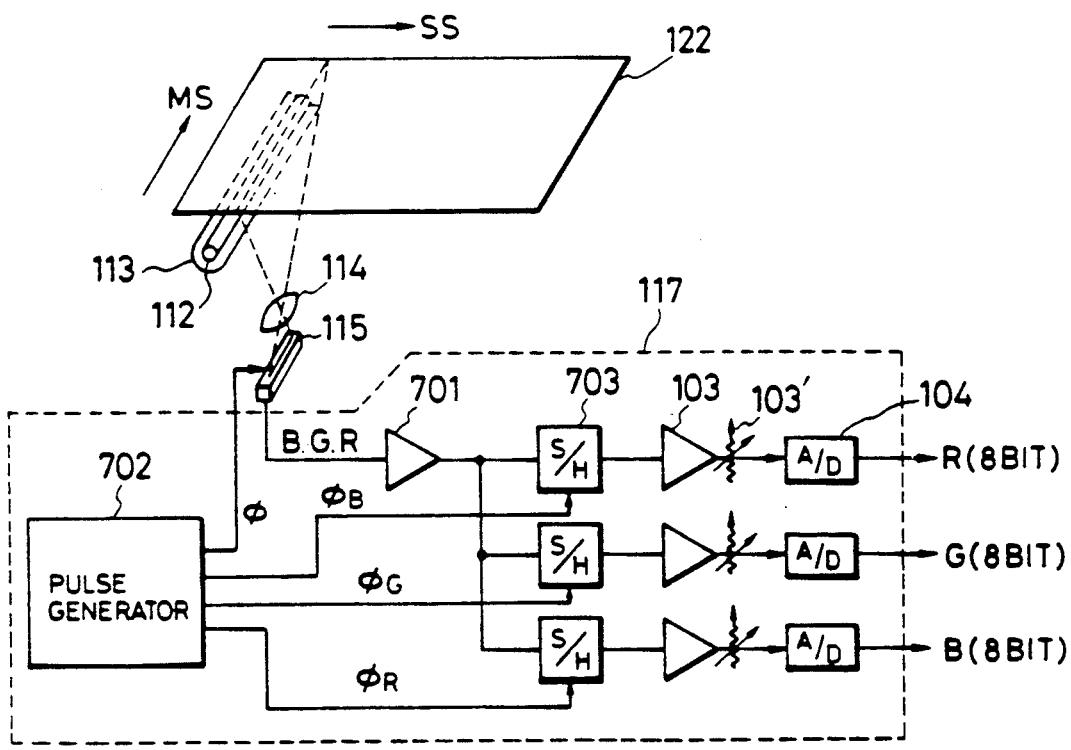
FIG. 5 is a circuit diagram of a reading circuit.

FIG. 5 is a block diagram of the reader unit. The image reading system will not be explained in detail as it is same as described before. On an original document 122, the main scanning direction and the sub scanning direction are respectively represented by MS and SS. The rod lens array 114 is simply illustrated as a lens.

The image signals from the sensor 115 are supplied to the aforementioned A/D conversion circuit board 117. The analog signals of B, G and R are serially entered, amplified in a preamplifier 701, and supplied to sample hold circuits 703. Timing pulses $\phi_B$, $\phi_G$, $\phi_R$ are used for causing the sample holdings of the serial analog signals of B, G, R, and a pulse generator 702 is provided for generating said timing pulses, including sample hold pulses for the CCD sensor.

The amplifiers 103 are provided with gain controllers 103' for mutually balancing the signals B, G, R. A/D converters 104 are provided for converting the analog signals of B, G, R respectively into digital signals of 8 bits each.

Figure 6:
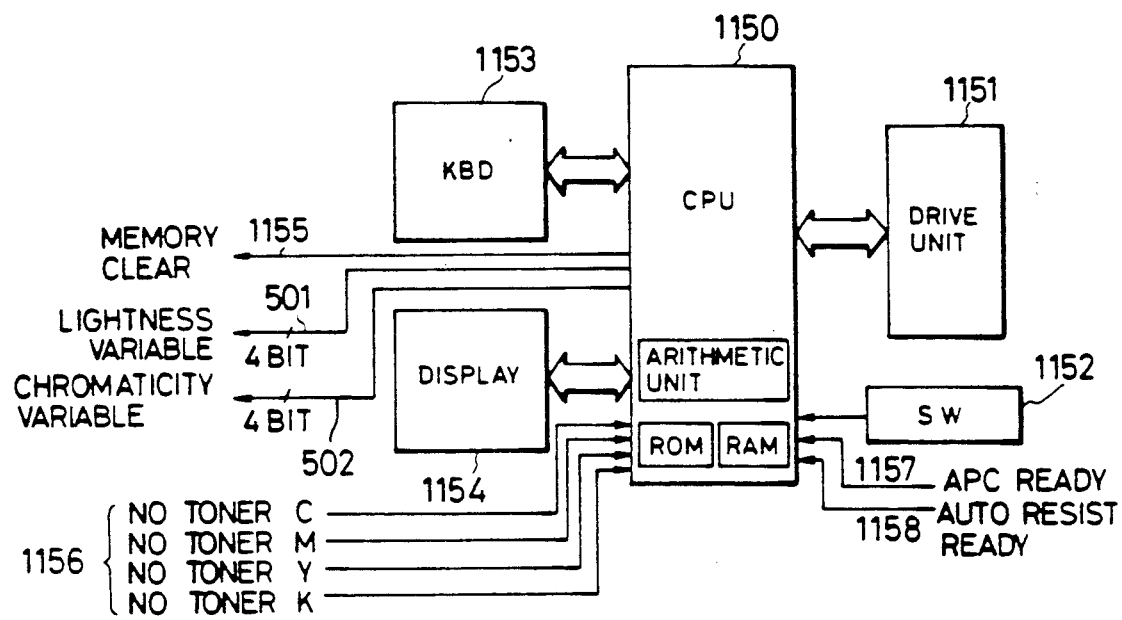
FIG. 6 is a circuit diagram of a control circuit of the reader unit.

FIG. 6 is a block diagram of a control circuit for controlling the reader unit. 1150 indicates a CPU composed for example of a microcomputer. A driving unit 1151 for activating various components of the reader unit corresponds for example to the aforementioned stepping motor 123. 1152 indicates a power switch of the printer unit. In case of sheet jamming in the printer unit, the power supply to the printer unit may be cut off during an operation to remove the jammed sheet. A keyboard 1153 is provided for data entry with the input keys shown in FIG. 7. A display unit 1154 turns on "no toner" lamps under the control of the CPU 1150 in response to signals 1156 for activating the copy number indicator 1103 shown in FIG. 7 or indicating the absence of toners of cyan, magenta, yellow and black. More specifically the operation panel shown in FIG. 7 is provided with four "no toner" lamps 1101 respectively indicating the absence of C(cyan), M (magenta), Y(yellow) or K(black) toner.

When any of said lamps is turned on, indicating the absence of corresponding toner, the color copying function is disabled, so that the normal copying operation cannot be started with the normal copy key 1107. However, for any other color, the copying operation can be started with a single-color copy key 1113. Naturally such single-color-copying is disabled when all four "no toner" lamps are turned on.

Figure 7:
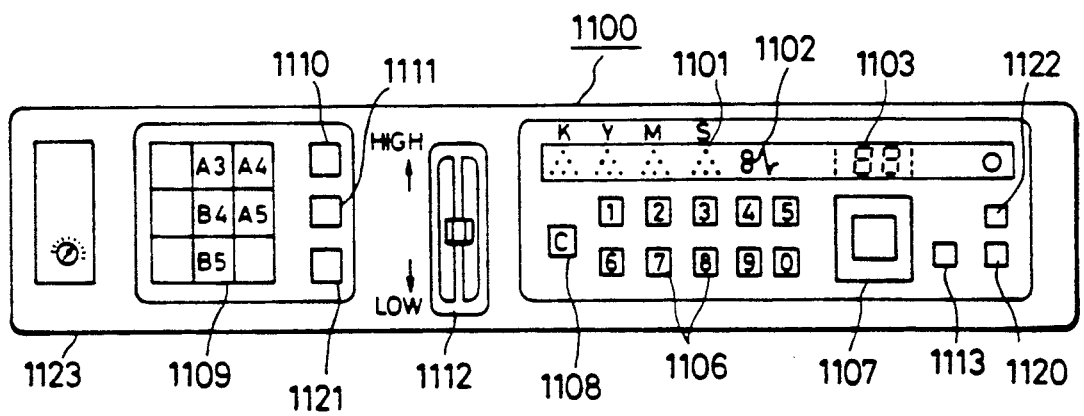
FIG. 7 is a plan view of an operation panel.

Referring to FIG. 7, there are shown numeral keys 1106 for entering copy number etc.; a clear key 1108 for clearing the number entered by the numeral keys; a number indicator 1103 for indicating the copy number etc.; a jam indicator 1102; a wait indicator 1105; a stop key 1120 for interrupting the copying operation etc.; upper and lower cassette selecting keys 1110, 1111 for respectively selecting the upper cassette 22A or the lower cassette 22B shown in FIG. 2; a paper deck selecting key 1121 for selecting the paper deck 23 shown in FIG. 2; a density lever 1112 for regulating the density of the color copy, by controlling the luminance signal L* in the present embodiment; and a memory clear key 1122 for forcedly erasing the image signals remaining in the image frame memory, particularly in case the copying operation is not re-started after sheet jamming.

In response to the actuation of said memory clear key 1122, the CPU 1150 sends a memory clear signal 1155 shown in FIG. 6 to the memory unit 300, thereby erasing the content thereof.

A color saturation knob 1123 regulates the color saturation by controlling the color signals a*, b*. An APC ready signal 1157 indicates the completion of a potential control to be explained later and a subsequent automatic power control on the laser output.

An auto registration ready signal 1158 indicates the completion of an automatic registration to be explained later. These signals have to be received before a copying operation is conducted. The copying operation is enabled and the wait indicator 1105 is turned off when other conditions which are required also in the ordinary copying machine, such as the temperature control of the fixing heater, presence of recording sheets, and the presence of all toners indicated by the signals 1156.

[1-4] Memory unit

The memory unit is used for storing the image signals between the reader unit and the printer unit. An image frame requires a memory capacity of 16 MBytes in case an image of A4 (210×297 mm) size is read with a resolving power of 16 pixels/mm in both scanning directions and with a gradation of 8 bits/pixel. The memory capacity becomes as large as 16×3 =48 MB if this is expanded to three colors R, G and B, or 16×4 =64 MB if this is expanded to four colors Y, M, C and K. Such capacities will require 384 (48 MB) or 512 (64 MB) DRAM's of 1Mbit, or a quarter of these figures even when 4Mbit DRAMS's are employed.

Also usual copying apparatus is required to handle sizes up to A3 size, so that the number of required memories will have to be doubled.

For this reason the present embodiment employs data compression in order to reduce the required memory capacity, thereby decreasing the number of memory chips, and to reduce the data processing time including data transmission. With a compression rate of 1/12, the memory capacity is reduced to 48 MB ÷12 =8 MB, which can be practically covered with 64 1M DRAM's.

Also the data bit width is increased to 32 bits to enable high-speed access.

Figure 8:
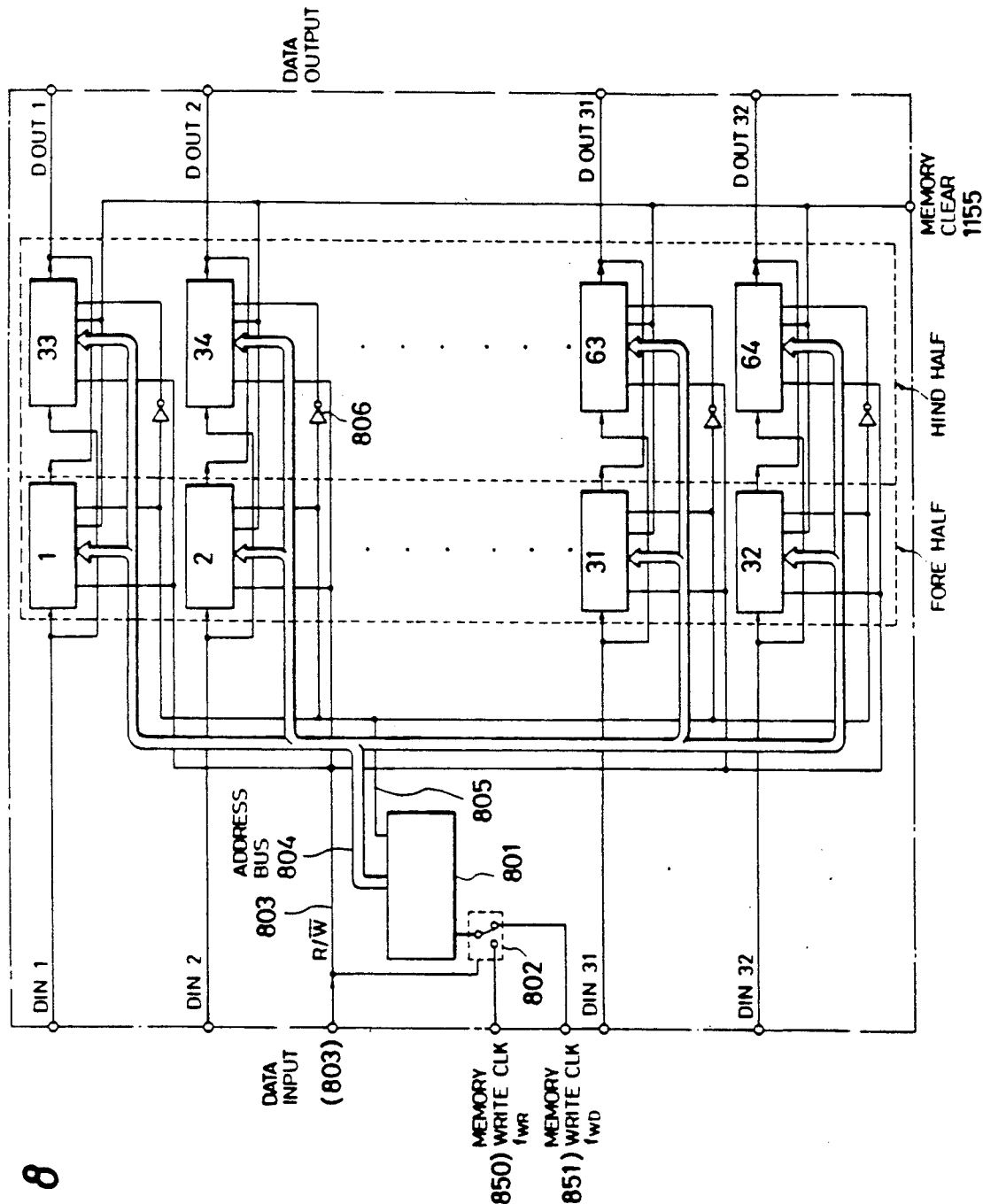
FIG. 8 is a circuit diagram of a memory circuit.

FIG. 8 shows the structure of memory in the present embodiment, employing 1Mbit memory chips 1-64, which are divided into a former half 1-32 and a latter half 33-64 for enabling 32 bit parallel entry. Since the entire memory capacity is 8 MB as explained above, there will be required 21 address lines for enabling 32 bit parallel access.

In FIG. 8, an address counter 801 generates said 21 addresses, of which lower 20 digits (A0–said A19) are supplied to each 1Mbit DRAM requiring 20 addresses. These are shown as an address bus 804 (A0–A19). 1 Mbit DRAM usually have a bit structure of 1 bit $\times 1048576$, and 20 addresses are usually divided RAS and CAS or upper 10 bits and lower 10 bits, but the detailed explanation will be omitted. Also the refreshing operation required for maintaining the content of DRAM will not be explained.

As explained above, 64 memory chips are divided into two groups, either of which is selected by a chip select signal CS, supplied through an address bus A20, shown by 805 in FIG. 8, according to the logic state of an inverter 806.

More specifically, the memory chips of the former half are selected by said signal CS when the address 805 of the uppermost digit is "0".

Figure 9:
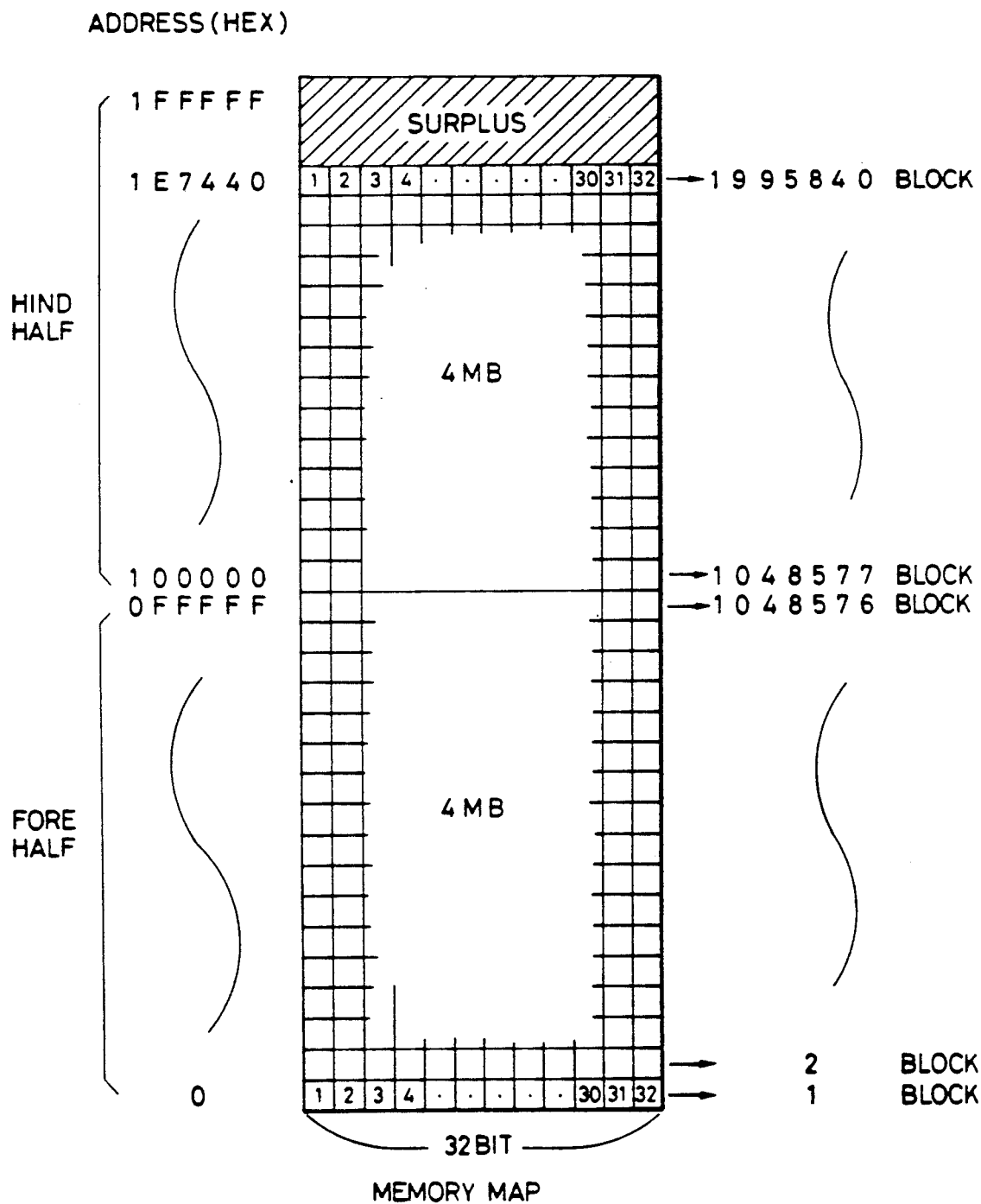
FIG. 9 is a memory map.

FIG. 9 shows the memory map of 8 MB, containing 1995840 blocks of 32 bits each, therefore requiring 1E7440(hex) addresses. These addresses are generated by an address counter 101 in synchronization with a reading clock f1 or a writing clock f2 either of which is selected by a signal 802.

A read/write select signal R/W selects the writing mode at "0" or the reading mode at "1". Each memory chip has a data input port Din and a data output port Dout, and the ports Din or Dout of the corresponding memory chips in the former half group and in the latter half group are mutually connected. The mutual connection of the output ports poses no problem because the output port Dout in particular is of a high impedance when it is not selected (CS="1").

The total memory capacity for A3 size was explained as 8 MB in the foregoing, the address in fact proceeds only to 1E7440 (Hex) because the area of A3 size (297 $\times$ 420 mm) expressed in binary number is different from 8MB. In fact the memory capacity in this case has a surplus of 101312 blocks, corresponding to an image area of ca. 21 mm $\times$ 297 mm.

In FIG. 8, the memory clear signal 1155 is used for clearing the content of all the memory chips as explained before, and is supplied to the clear terminal CLR of each memory chip.

[1-5] Printer unit

As shown in FIG. 3, the four-drum color printer 200 has four units, each having a photosensitive drum, and containing toners of different colors in color developing units 205.

Also in FIG. 3 there are provided laser units 201C, 201M, 201Y and 201K respectively for color signals of cyan (C), magenta (M), yellow (Y) and black (K). Each unit has an unrepresented rotating polygon mirror to deflect the laser beam in the main scanning direction, thereby forming the main scanning line.

In each of the identically constructed units, the photosensitive drum 211 is rotated clockwise and surfacially changed with a charger 212.

The laser beam is turned on and off to record the pixel information in the form of a latent image, which is rendered visible by the deposition of color toner with a developing sleeve 206. The obtained toner image is transferred, by a transfer charger 210, to a recording sheet supplied from a cassette 208 through a feed roller 207. The front end position of the sheet is adjusted by registration roller 250.

The recording sheet is transported, by a conveyor belt 209, from the cyan color development to the next color unit of magenta. Subsequently yellow and black toner images are overlaid in succession, and the sheet is transported to a fixing station 213 when the toner images of four colors are overlaid, and the images are fixed with heating rollers 216. Then the sheet is discharged to a tray 215 by discharge rollers 216.

Figure 29:
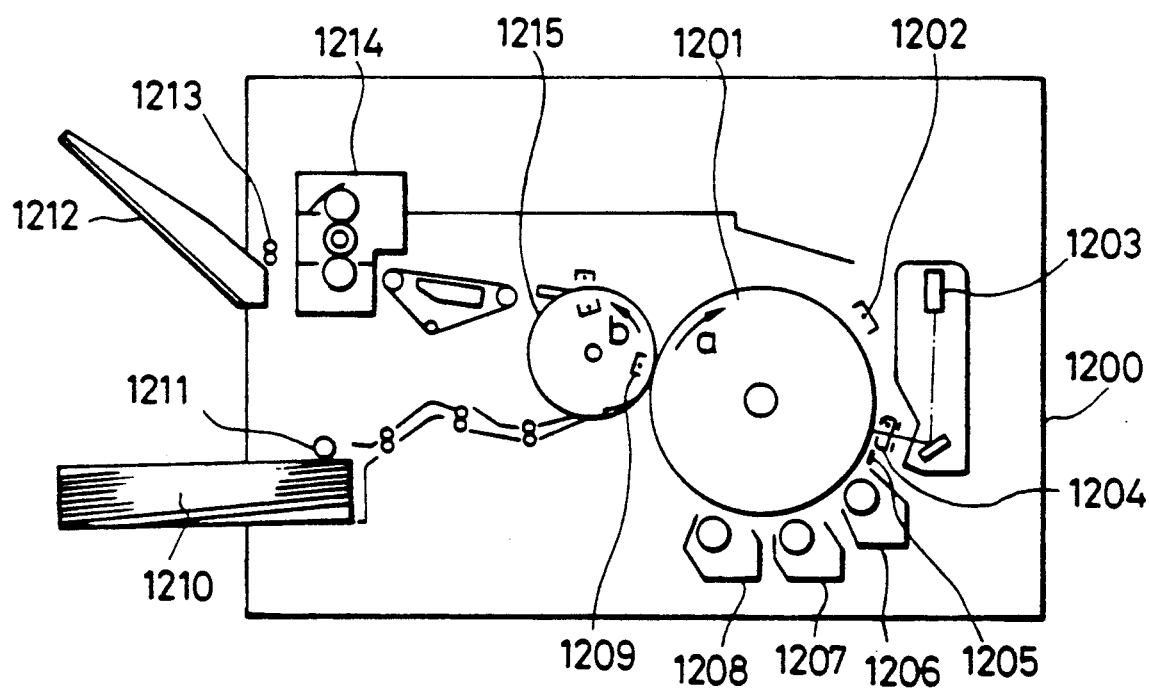
FIG. 29 is a cross-sectional view of a conventional one-drum color copying machine.

In the one-drum color copying apparatus shown in FIG. 29, the deterioration of image quality caused by the sensitivity loss of the photosensitive member affects all the colors in the same manner. Consequently the color balance remains relatively balanced even in case of such deterioration. Consequently the deterioration of image quality can be prevented by a simple surface potential control.

On the other hand, in the four-drum color copying apparatus, four drums undergo independent changes in sensitivity. Also the color balance is affected for example by the replacement of one of photosensitive drums with a new one. These drawbacks are resolved by the present embodiment.

Figure 10:
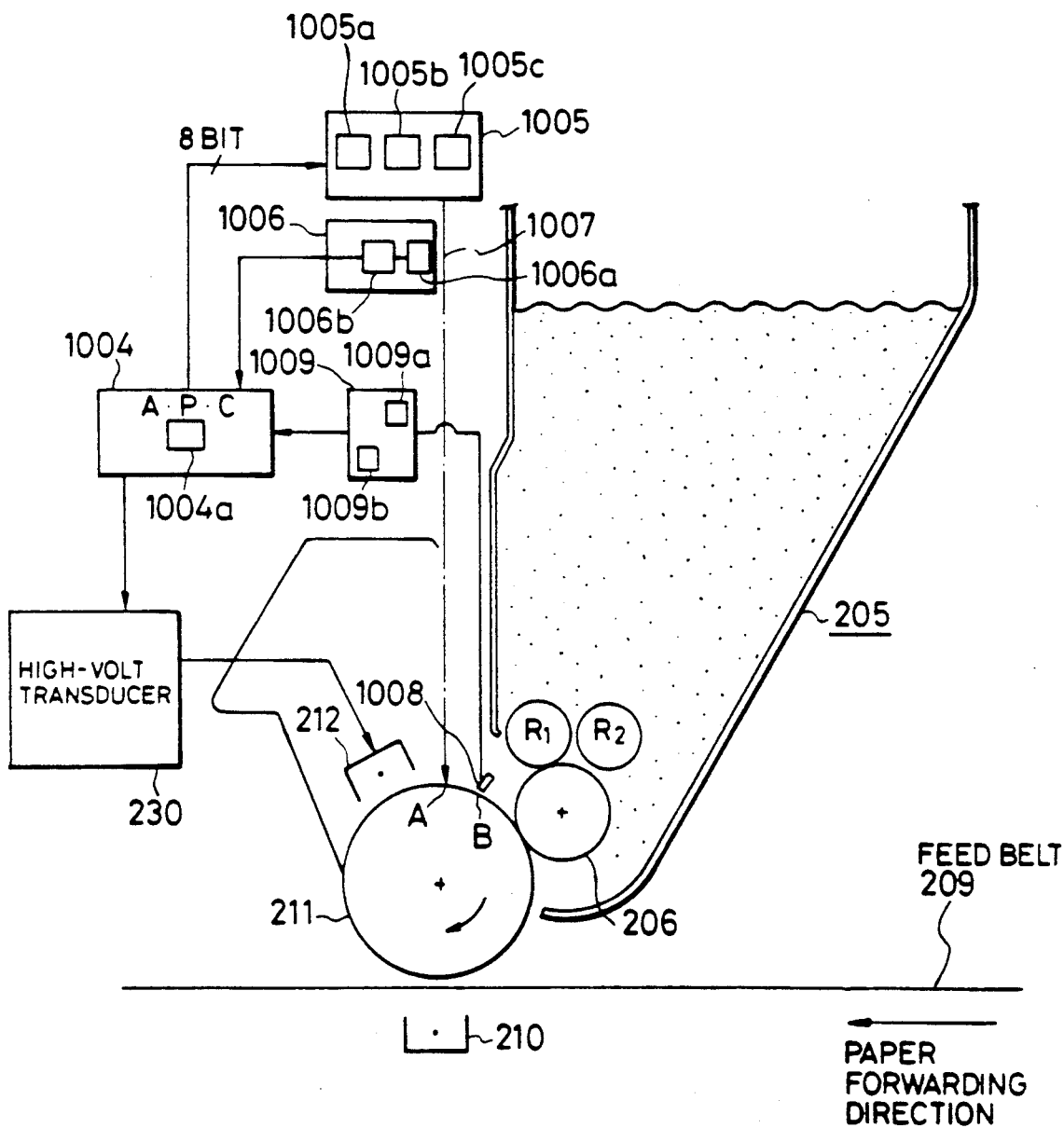
FIG. 10 is a circuit diagram of an APC circuit.

FIG. 10 is a magnified view of the photosensitive drum 211 and the associated structure of a unit. There is provided a potential sensor 1008 for measuring the surface potential of the photosensitive drum 211.

The photosensitive drum is charged to a surface potential V0 by the corona discharge with the charger 212, but undergoes a dark decay to an exposure position A where the exposure with laser beam is conducted, as shown in FIG. 10. The surface potential is changed by the amount of exposure, or the level of the laser power. In case of analog recording, the image density can be regulated by the intensity of the laser beam, but such density regulation is not required in the digital recording of the present embodiment.

As shown in FIG. 10, a high voltage transformer 230 is provided, in order to maintain a predetermined laser power and a constant beam diameter for irradiating the photosensitive drum 211. The sensitivity of the drum is identified by measuring the surface potential thereof in this state.

The surface potential measured with said sensor after exposure with a predetermined laser power is assumed as $V_{L0}$. This is the target value, and the actual value $V_{L1}$ is higher, thus reducing the dynamic range, due to the deterioration of the photosensitive drum 211 or an insufficient exposure cause by the deterioration of the laser power. In either case, the problem can be resolved by the increase of the laser power. The control of the potential control will be explained in the item [2-3].

Figure 11:
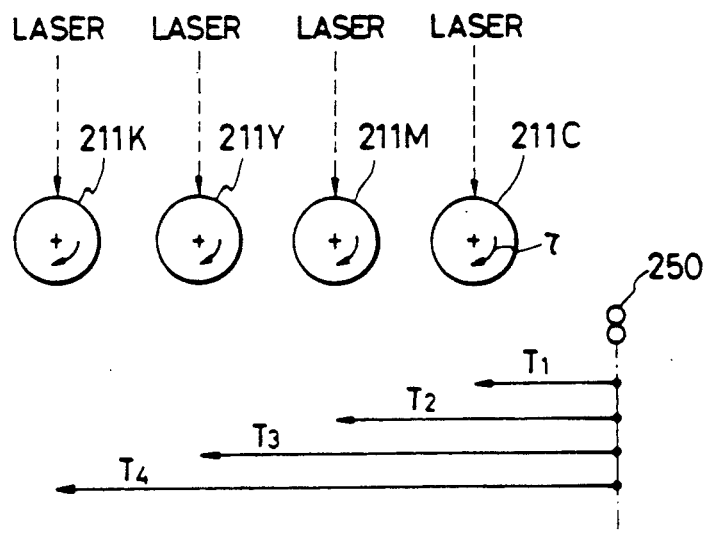
FIGS. 11, 12A, 12B, 12C and 13 are views and charts showing the principle of registration control.

FIG. 11 illustrates the timings of starting the image recordings.

The front end of the recording sheet 208 advanced by the registration roller 250 as explained before reaches the photosensitive drum 211C, 211M, 11Y or 211K respectively at a time T1, T2, T3 or T4 from the feed timing T0 to start the transfer of the toner image.

Figure 12A:
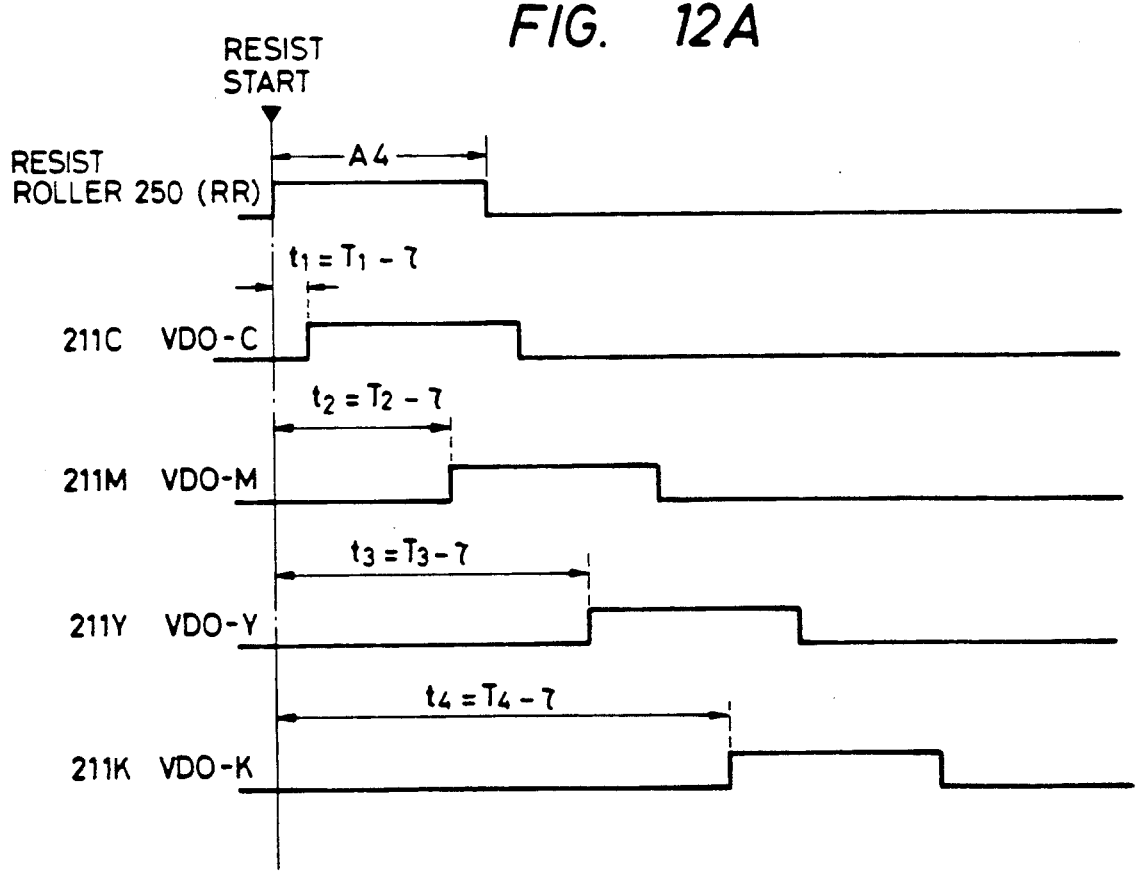

FIG. 12A is a timing chart showing the proceeding of said image transfers.

Figure 12B:
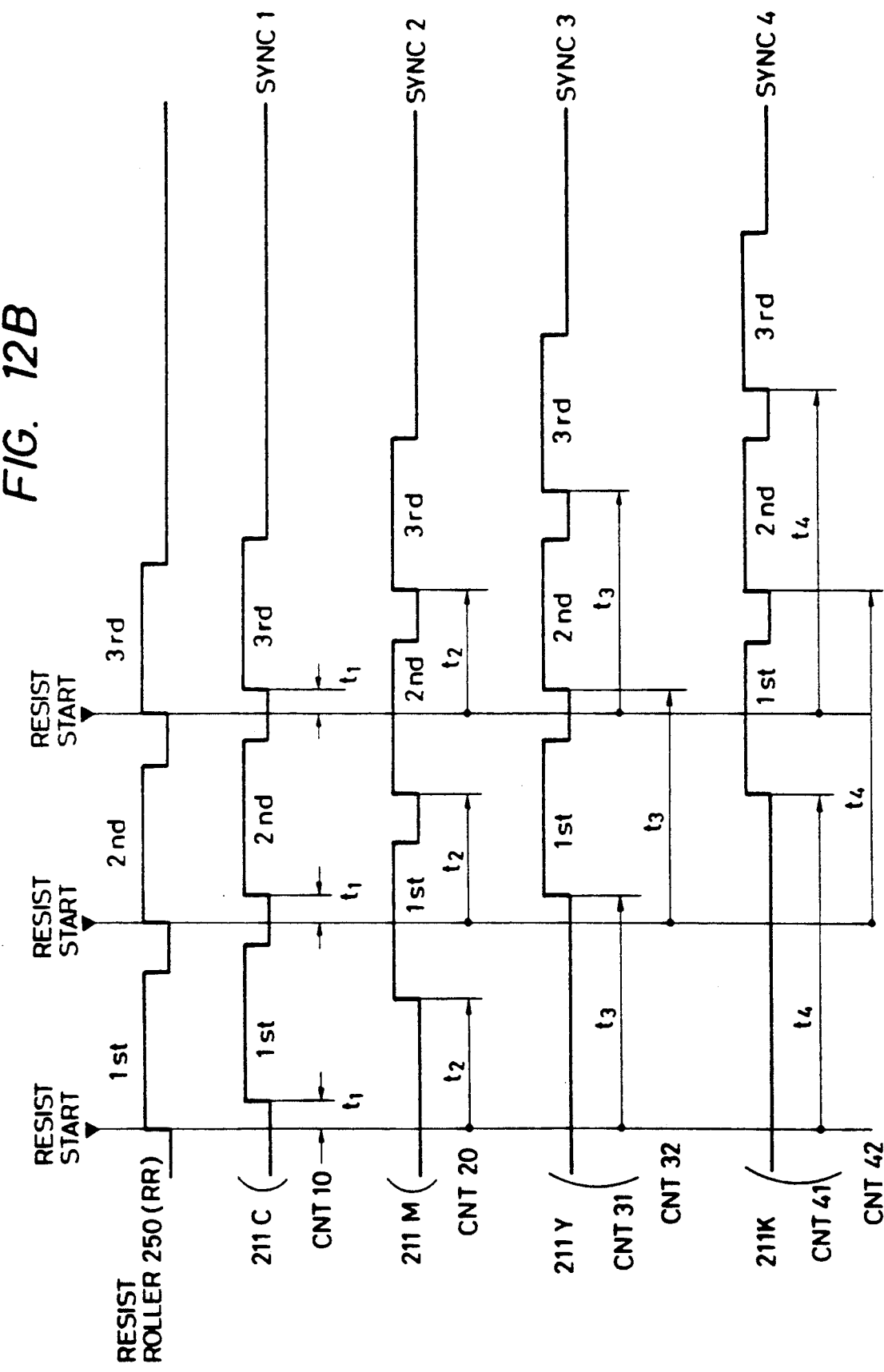
Figure 12C:
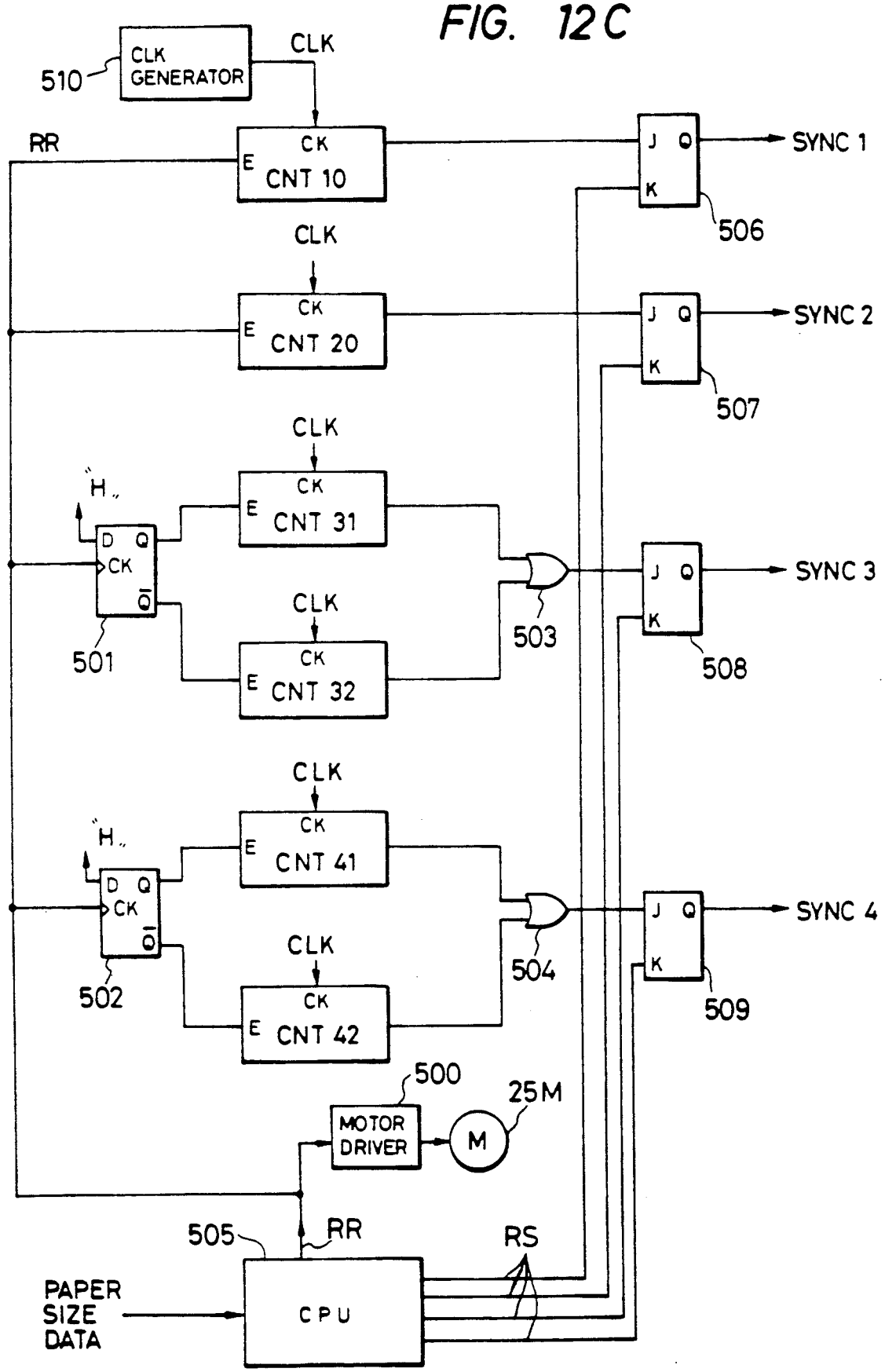

In response to an output signal RR from the CPU 505 shown in FIG. 12C, the registration rollers 250 starts rotation from a time T0, and said signal RR is continued for a period required by the sheet to pass through said rollers, depending on the size of the sheet. The image transfer from each photosensitive drum is started with a delay T1, T2, T3 or T4. Thus the recording on each photosensitive drum is started with a delay $t_1 = T_1 - \tau$, $t_2 = T_2 - \tau$, $t_3 = T_3 - \tau$ or $t_4 = T_4 - \tau$, wherein $\tau$ is the time required by each photosensitive drum to reach the image transfer position from the laser recording position, and the image recording is conducted for a duration same as the driving time of the registration roller 250.

FIG. 12B shows the timings of image signal recording on plural photosensitive drums in case of consecutively obtaining three copies. For the photosensitive drums 211C and 211M, the write timing signals SYNC1, SYNC2 are by counting t1, t2 respectively with counters CNT10, CNT 20 in the same sequence as shown in FIG. 12A.

However, for the photosensitive drums 211Y and 211K, a next recording sheet is already advanced before the time t3 or t4 expires for the first recording sheet. For this reason counters CNT 32, CNT 42 for measuring the times t3, t4 are additionally provided, and the counters CNT31 and CNT 32, or CNT 41 and CNT 42 are alternately used to obtain the write timing signal SYNC3 or SYNC4 for the second or third sheet.

FIG. 12C shows a circuit for obtaining the write timing signals SYNC1-SYNC4.

The above-explained counters CNT10, CNT20, CNT 31, CNT 32, CNT41, CNT42 perform time measuring operation by counting clock pulses CLK from a clock generator 510. There are provided a driver circuit 500 for a motor 25M for rotating the registration rollers 250, to be activated by the registration roller signal RR; toggle circuits 501, 502 for activating the counter CNT 31 or CNT 32 according to the number of the registration roller signals RR; OR circuits 503, 504 for releasing an output signal in case the counter CNT31 or CNT32 has completed the counting operation to set a JK flip-flop 508 for generating the write signal SYNC3; and flip-flops 506–509 each set by the completion of the counting operation and reset by a reset signal RS from the CPU 505. The duration of setting is calculated according to the size of the recording sheet, and coincides with the rotating period of the registration rollers 250 shown in FIG. 12A, or the duration of the signal RR.

The photosensitive drum 211C or 211M requires only one counter, but the photosensitive drum 211Y or 211K in the present embodiment uses two counters. The number of counters is determined by the sheet size and the distance between the photosensitive drums, but in general the drum at the upstream side requires fewer counters.

In the present embodiment the counting operation of each counter is started by the registration signal RR, but it may also be started by detecting means for the recording sheet positioned upstream of the image transfer position of the first photosensitive drum. Also the counter utilized as the time measuring means may be replaced by a timer composed of capacitors and resistors.

Because of the above-explained difficulties specific to the four-drum printer, the access to the image frame memory is modified accordingly.

Figure 13:
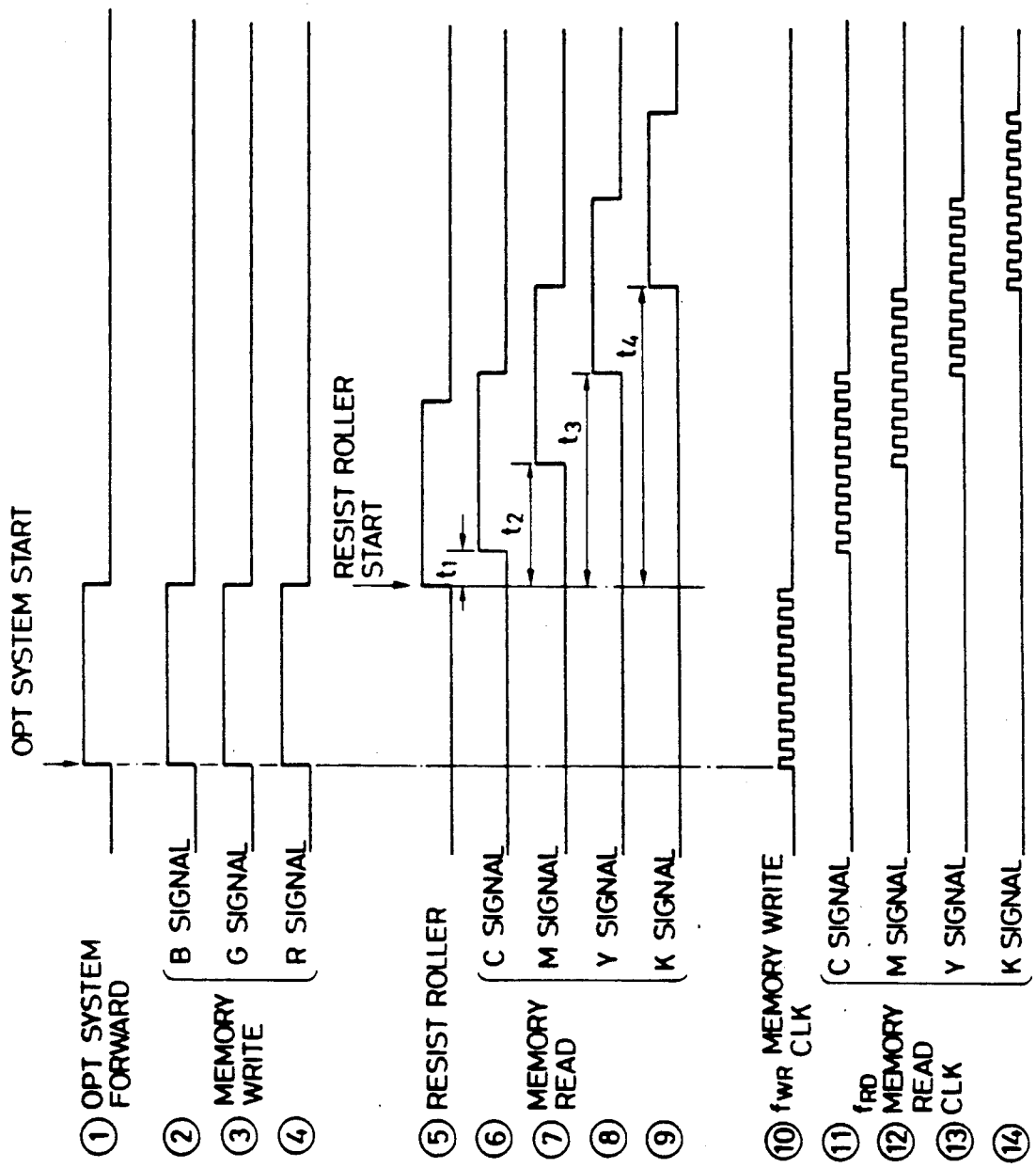

FIG. 13 shows the timing of data storage into the memory by the movement of the optical system in the reader unit and the timing of image recording by the activation of the registration rollers in the printer unit and by the laser units thereof.

In FIG. 13, (1) indicates the timing of image reading by the movement of the optical system 118 shown in FIG. 3, while (2), (3) and (4) indicate image signals R, G, B of the A/D conversion circuit board 117 shown in FIG. 5. Said image signals are supplied to the memory unit 300, in synchronization with memory write clock signal $f_{WR}$ (10), for color conversion, data compression and storage. The image signals stored in the memory are then supplied to the printer unit.

Since four photosensitive drums are in different positions, the image signals C, M, Y and K have to be independently obtained in a synchronous manner.

In FIG. 13 these signals are represented by (6), (7), (8) and (9), and (11), (12), (13) and (14) are respectively corresponding read-out clock signals $f_{RD}$.

These operations can be achieved by high-speed switching in the color conversion circuit 250 of the printer unit 200 shown in FIG. 1.

In the memory unit, as shown in FIG. 8, the memory write clock signal $f_{WR}$ (850) and the memory read clock signal $f_{RD}$ (851) are supplied to a multiplexer 802, switched according to the timing of data writing and reading, and supplied to an address counter 801 which accordingly generates addresses for the memory chips. The address in this case is not increased in the unit of pixel but in the unit of a block of 4×4 pixels.

[2] Automatic correction of color registration

In a four-drum digital color copying apparatus such as in the present embodiment, the formation of an image with proper color through correction of color registration is naturally one of basic requirements. For this reason, the apparatus of the present embodiment is provided with means for automatic correction of color registration.

[2-1] Correcting means

A sharp color image without error in the color registration can be obtained in the laser beam printer, by forming unfixed registration markers on the conveyor belt with the usual image forming means, then measuring the errors in the color registration and accordingly controlling the timing of image recording.

More specifically there are provided image formation control means for forming, respectively in plural areas of a recording medium divided in the main scanning direction, predetermined images formed on respective photosensitive drums; registration error measuring means for measuring the relative positional errors of the images formed in said areas by said image formation control means; and registration error correcting means for correcting the timing of image recording with the laser beam on each photosensitive drum, according to the error measured by said measuring means.

Figure 14:
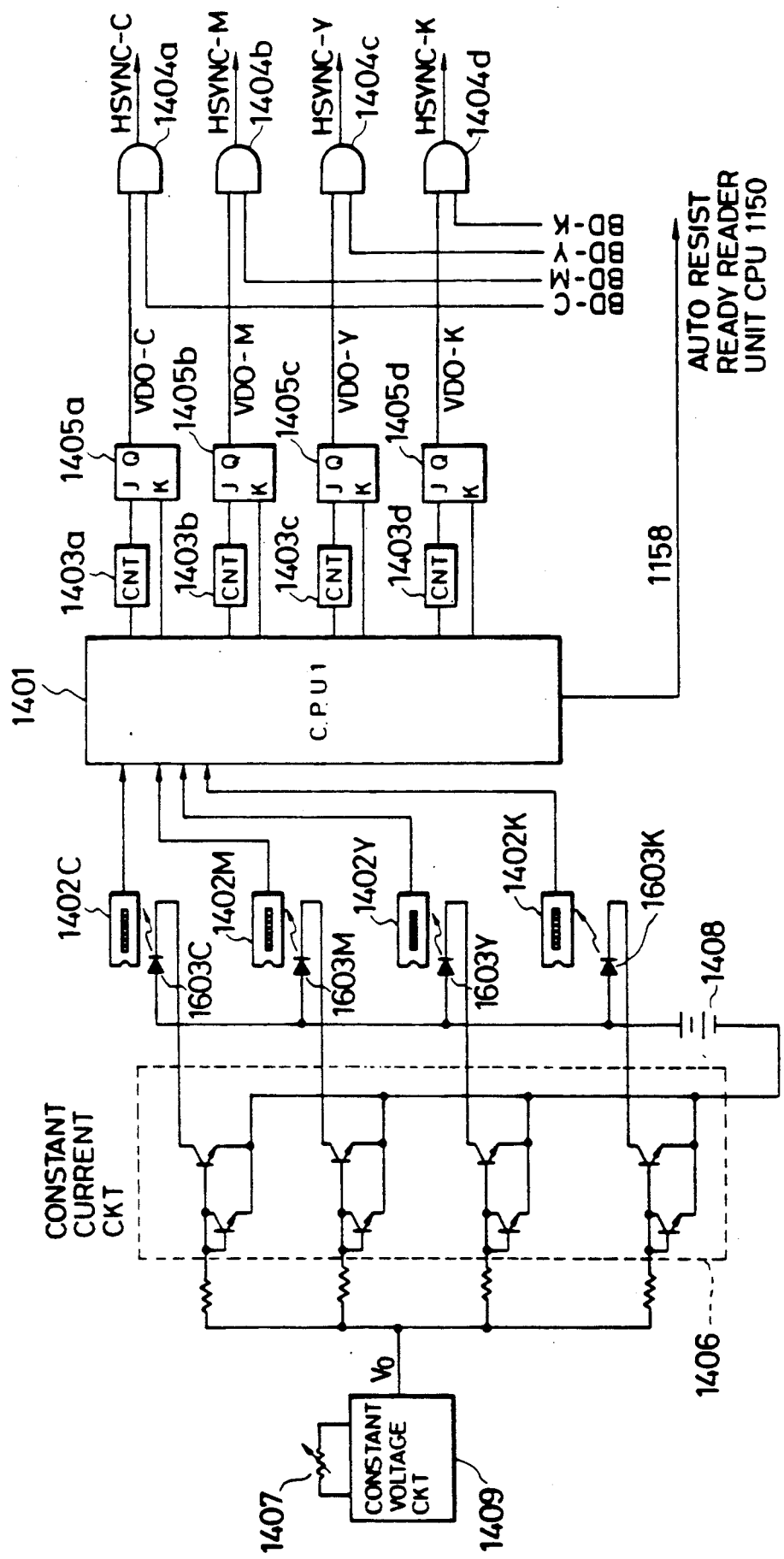
FIG. 14 a circuit diagram showing of a positional error detecting and controlling circuit.

FIG. 14 is a block diagram of a positional error correcting circuit, wherein a CPU 1401 causes the formation of predetermined images respectively in areas of a transported recording medium divided in the main scanning direction, and calculates the registration errors of said images from the outputs of positional error detectors 1402C, 1402M, 1402Y and 1402K composed for example of CCD's. There are provided counters 1403a–1403d. The counter 1403a counts the time from the start of a recording sheet from the registration rollers to the start of cyan image recording. The counter 1403b counts the timing of starting the image recording, including the positional error of the magenta image with respect to the cyan image calculated by the CPU 1401. Similarly the counter 1403c counts the positional error of the yellow image with respect to the cyan image, calculated by the CPU 1401, and the counter 1403d counts the positional error of the black image with respect to the cyan image, calculated by the CPU 1401.

When the counters 1403a-1403d complete the counting operations, they release carry signals to set JK flip-flops 1405a-1405d thereby shifting write enable signals VDOa-VDOd to the H-level. Thus AND gates 1404a-1404d are opened to release the aforementioned beam detection signals BD-C-BD-K, which constitute horizontal synchronization signals HSYNC for controlling the synchronization of the laser beam in the main scanning direction. Said signals HSYNC are supplied to the image memory.

Figure 15:
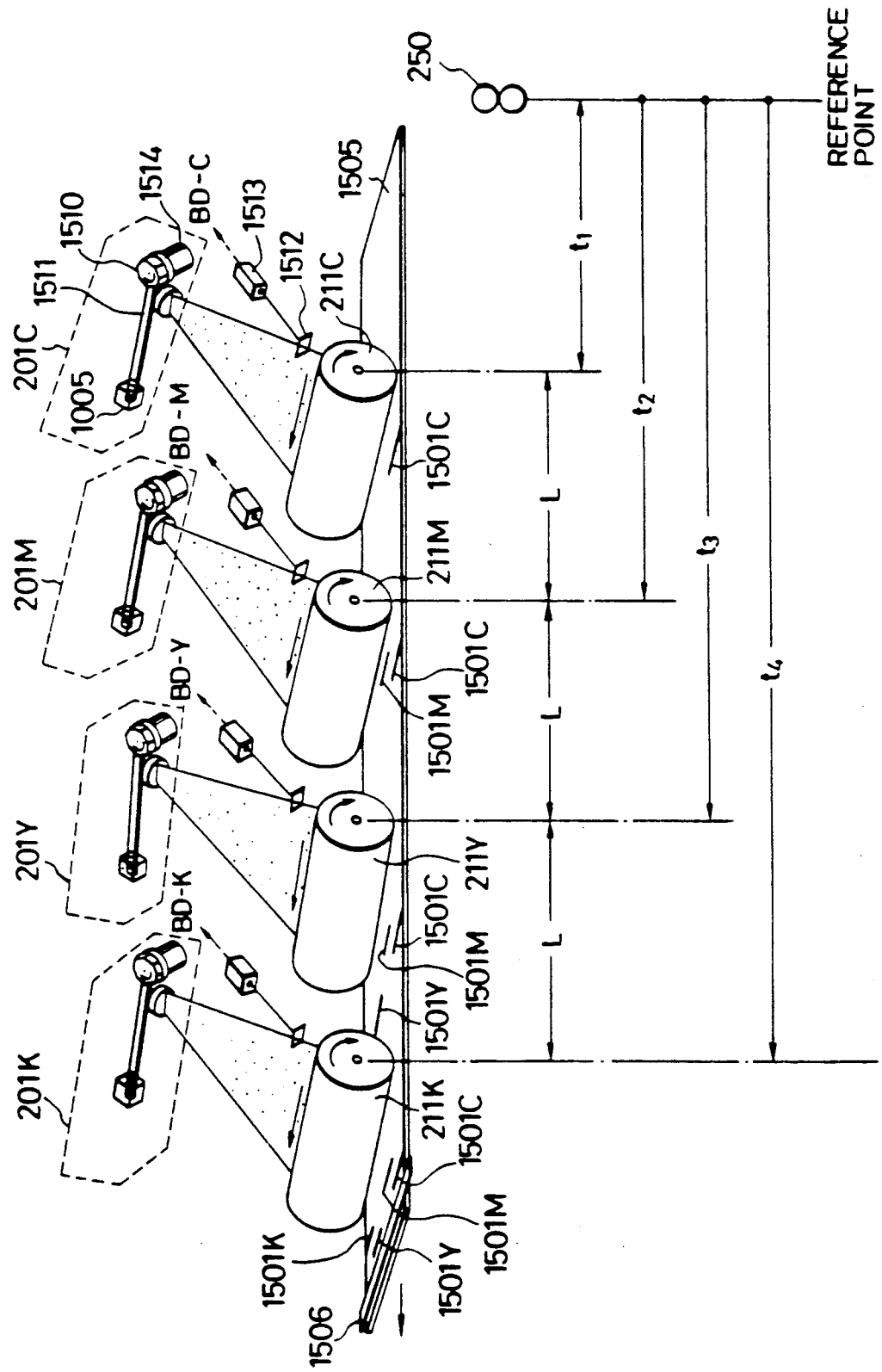
FIG. 15 is a perspective view showing the principle of registration control.
Figure 18:
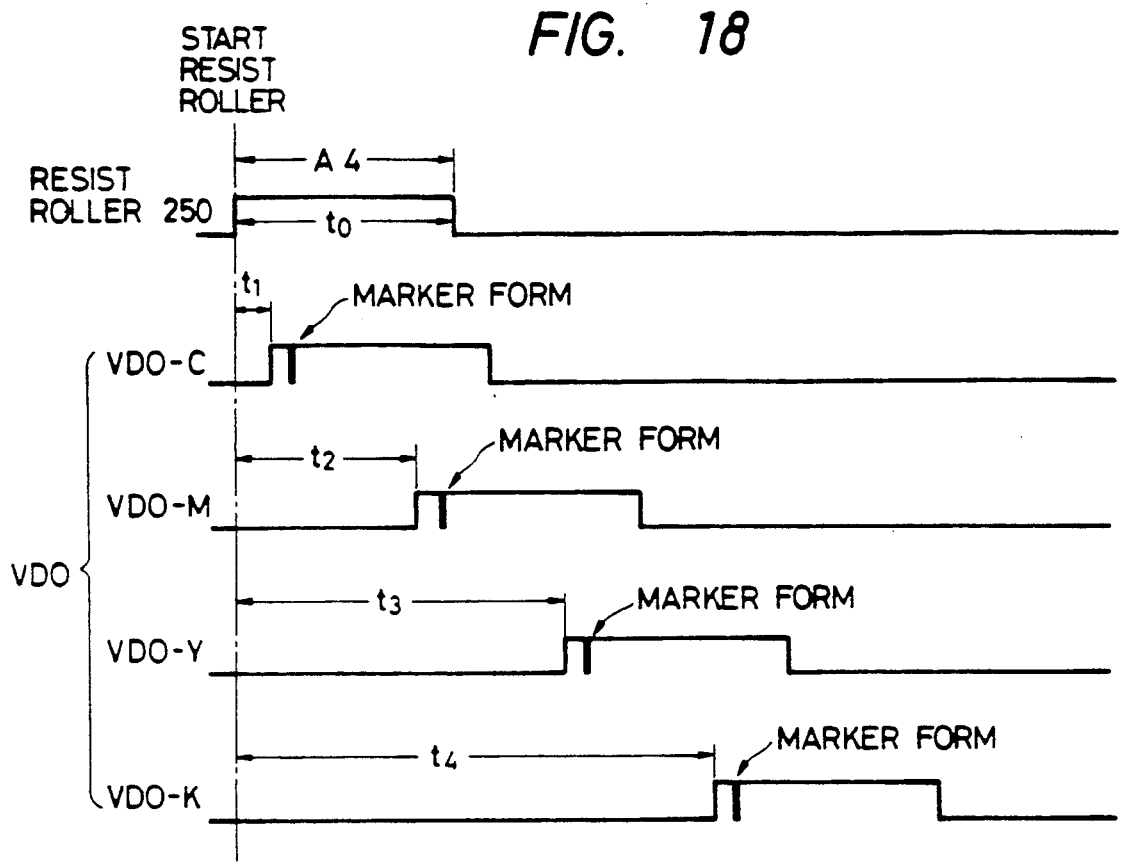
FIG. 18 is a timing chart showing the timing of registration mark formation.

FIG. 15 is a perspective view showing the principle of positional error detection in the present embodiment. The recording medium 1505 is constituted by the conveyor belt in the present embodiment. Latent images formed by the laser units 201C, 201M, 201Y, 201K on the photosensitive drums 211C, 211M, 211Y, 211K are developed to obtain predetermined images 1501C, 1501M, 1501Y, 1501K. A sensor circuit board 1506 is provided with positional error detectors 1402C, 1402M, 1402Y, 1402K in predetermined positions. It is assumed that the photosensitive drums 211C, 211M, 211Y, 211K are positioned with a given distance L, and that the image formation starts at a time t1, t2, t3 or t4 from the start of sheet feeding from the registration rollers 250, respectively on the photosensitive drum 211C, 211M, 211Y or 211K, as shown in FIG. 18. As shown in FIG. 18, the registration rollers 250 are maintained in rotation, after having started to feed the recording sheet, for a period t0 necessary for the sheet of A4 size to pass through said registration rollers 250. The image write enable signals VDO-C, VDO-M, VDO-Y and VDO-K enable the image storage respectively after times t1, t2, t3 and t4 from the start of feeding of the recording sheet by the rotation of the registration rollers 250. The timings remain unchanged even when the recording sheet is not fed as in the present case.

Figure 19:
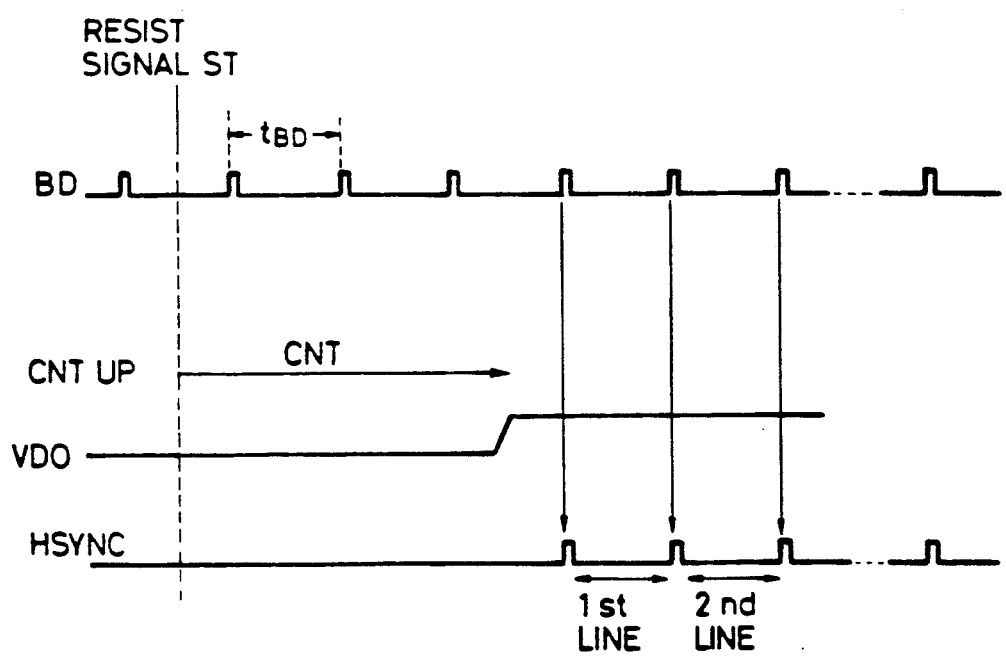
FIG. 19 is a timing chart showing the timing of HSYNC signal.
Figure 20:
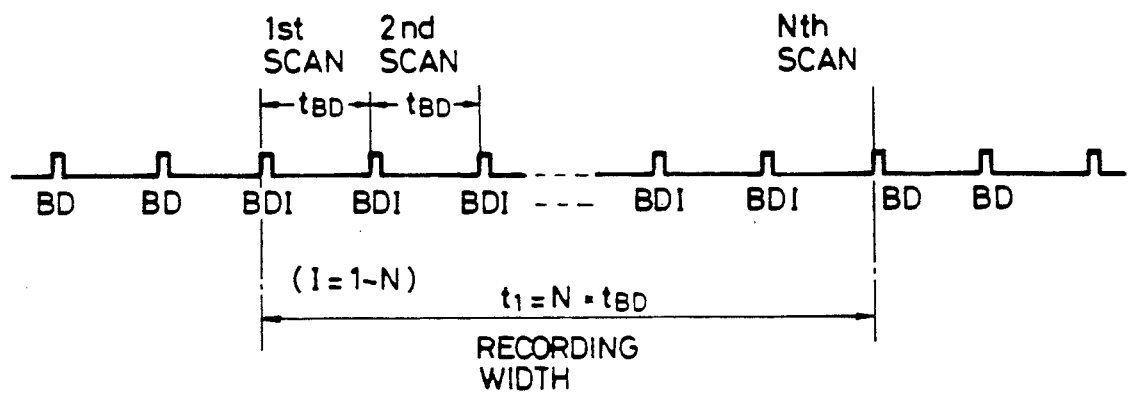
FIG. 20 is a chart showing the relation between the recording width and a BD signal.

Now reference is made to FIG. 19 for more detailed explanation. In FIG. 19, the beam detection signal BD from the beam detector 1513 is released during the rotation of the polygon mirror.

As already explained before, upon completion of the counting operations of the counters 1403a-1403d, the JK flip-flops 1405a-1405d are set through J terminals thereof to release H-level output signals. The beam detection signal BD is extracted by the AND agtes 1404a-1404d only during the image formation to provide HSYNC signals. The image formation is conducted by reading the image signals from the memory 300 in synchronization with said signals HSYNC as shown in FIG. 17.

Figure 17:
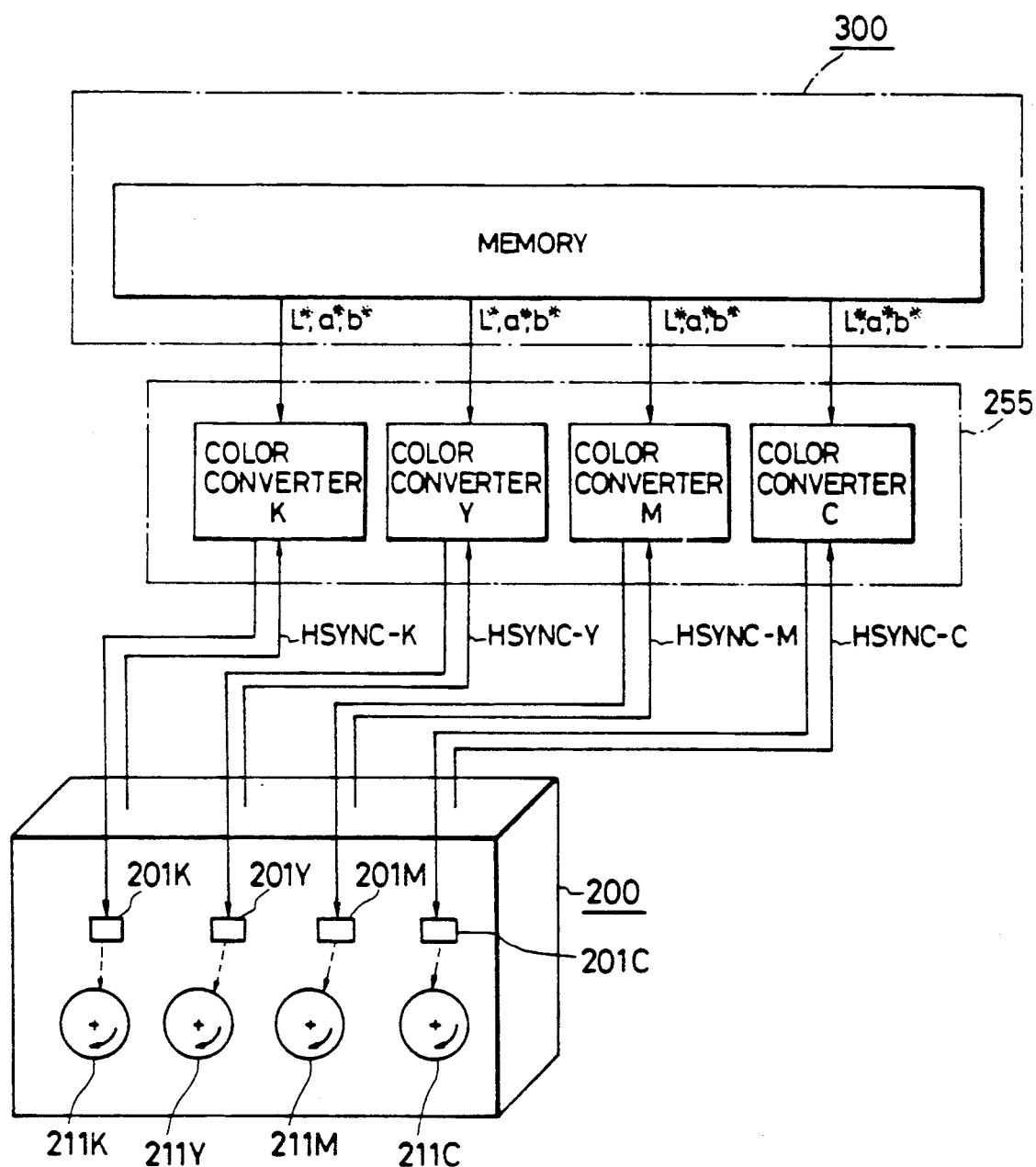
FIG. 17 is a schematic view showing an interface between a memory unit and a printer unit.

In FIG. 17, the signals HSYNC-C, HSYNC-M, HSYNC-Y and HSYNC-K made access to the memory unit 300 to supply the image signals C, M, Y and K to the laser units 201C, 201M, 201Y and 201K.

A color converter 255 converts the luminance signal L* and color signals a*, b* into the signals C, M, Y and K, as shown in FIG. 1.

Figure 16:
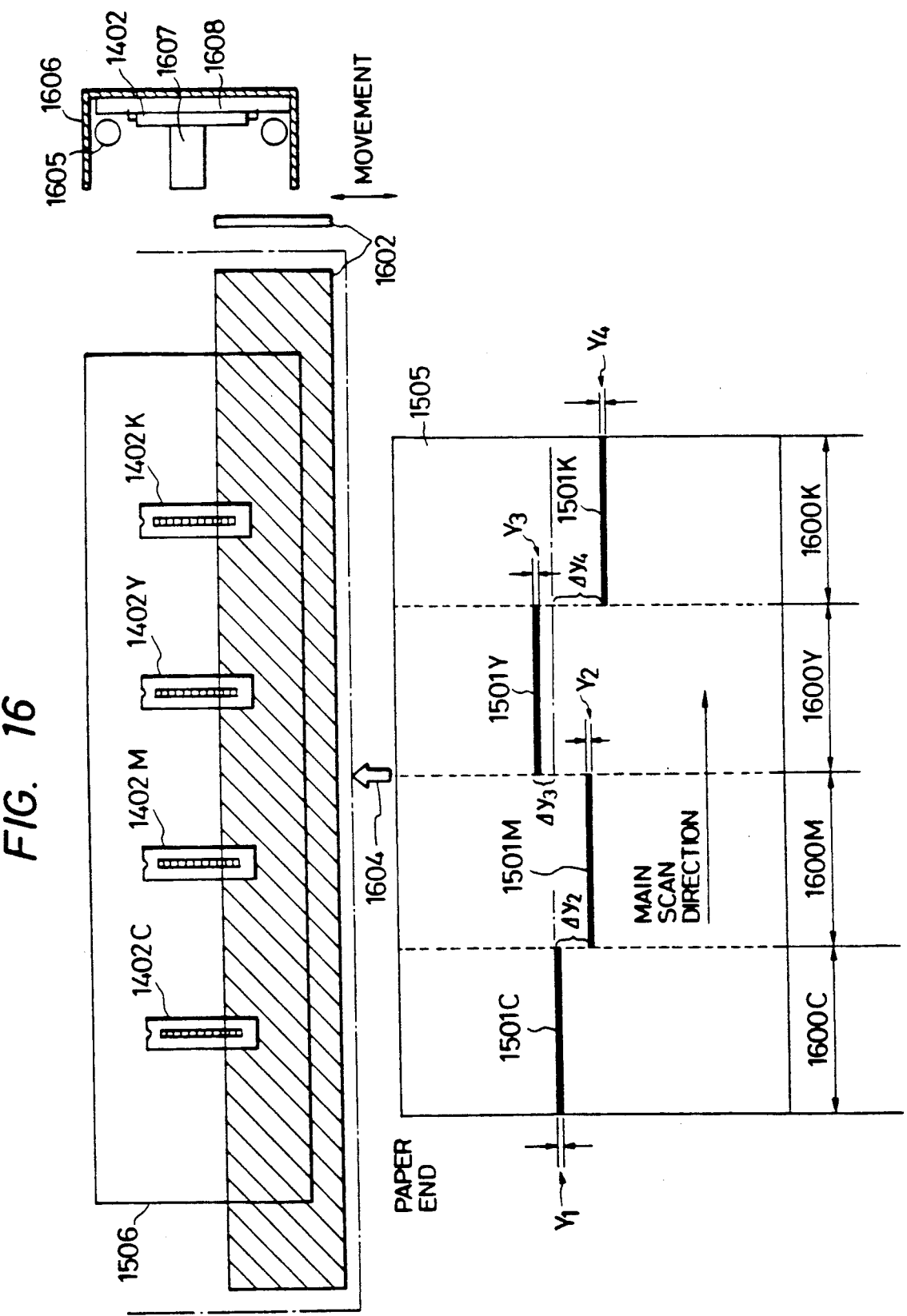
FIG. 16 a schematic view showing the principle of positional error.

FIG. 16 is a plan view of the sensor circuit board 1506 shown in FIG. 15, wherein same components as those in FIG. 15 are represented by same numbers.

The aforementioned recording medium 1505 has areas 1600C, 1600M, 1600Y, 1600K of different colors divided in the main scanning direction. In the illustrated case, with respect to the image 1501C formed on the area 1600C, the images 1501M, 1501Y, 1501K respectively formed in the areas 1600M, 1600Y, 1600K have positional errors of $\Delta y2$, $\Delta y3$ and $\Delta y4$. A reference plate 1602 eliminates the errors in the mounting of the error detectors 1402C, 1402M, 1402Y and 1402K. An arrow 1604 indicates the moving direction of the recording medium 1505 or the sub scanning direction.

After the formation of the predetermined images 1501C-1501K in the areas 1600C-1600K of the transported recording medium 1505 by means of the photosensitive drums 211C-211K mutually distanced by L, namely after the lapse of time t4, said images are transported to the position of the sensor circuit board 1506. Thus the images 1501C-1501K in said areas 1600C-1600K are detected by the positional error sensors 1402C-1402K. In this operation, the relative positional errors $\Delta y2$, $\Delta y3$, $\Delta y4$ of the images 1501M-1501K with reference to the image 1501C, and the corresponding times are added to the aforementioned periods t2, t3, t4 and the obtained values (t2 $+\Delta|y2|$), (t3 $-|\Delta y3|$) and (t4 $+|\Delta y4|$) are respectively set in the counters 1303b-1303d. Thus, in the image formation. Thus, after the lapse of the corrected periods determined by the completion of the counting operation of the counters 1403b-1403d, the enable signals VDO-C, VDO-M, VDO-Y, VDO-K are released to the laser units 201M, 201Y, 201K.

In this manner the errors in color registration can be automatically corrected.

As explained in the foregoing, a marker reading method is proposed for automatically correcting the errors in the color registration. This method is naturally based on stable formation of markers, and said stable formation requires that:

(i) the revolution of four polygon mirrors is exactly same; and (ii) the four photosensitive drums have almost same sensitivity so that the markers do not show significant difference in density.

The first requirement is achieved by employing a common oscillator, for example a crystal oscillator, for the control circuits of plural polygon mirrors. Also the second requirement is achieved through the control of the surface potential.

In the present embodiment means for resolving these requirements constitute important technical components of automatic correction of color registration, as will be explained in the following. As shown in FIG. 16, the widths Y1-Y4 of the markers 1501C-1501K are proportional to the number of main scanning lines and are represented by the product of a time $t1 = N \times t_{BD}$ and the process speed. Said widths Y1-Y4 are formed by the laser beam irradiations from four polygon mirrors. Consequently the fluctuation in the time $t_{BD}$ naturally affects said widths Y1-Y4. Also the precision of marker detection can be improved by maintaining a constant density of the markers through the control of surface potential.

[2-2] Use of common reference oscillator

In the following there will be given further explanation on the laser units 201C, 201M, 201Y, 201K shown in FIGS. 1, 3 and 15. The following description will however be concentrated on the laser unit 201C and other units will not be explained.

In FIG. 15, the laser beam emitted by a semiconductor laser 1005 is reflected by a polygon mirror 1510 and uniformly scans the photosensitive drum 211C through an f-θ lens 1511, in a direction indicated by an arrow. A mirror 1512 receives the laser beam from the laser unit 201C in front of the start position of image recording and guides said beam to a beam detection signal generating unit 1513 to generate the signal BD-C. Such structure is same for other laser units.

Figure 21:
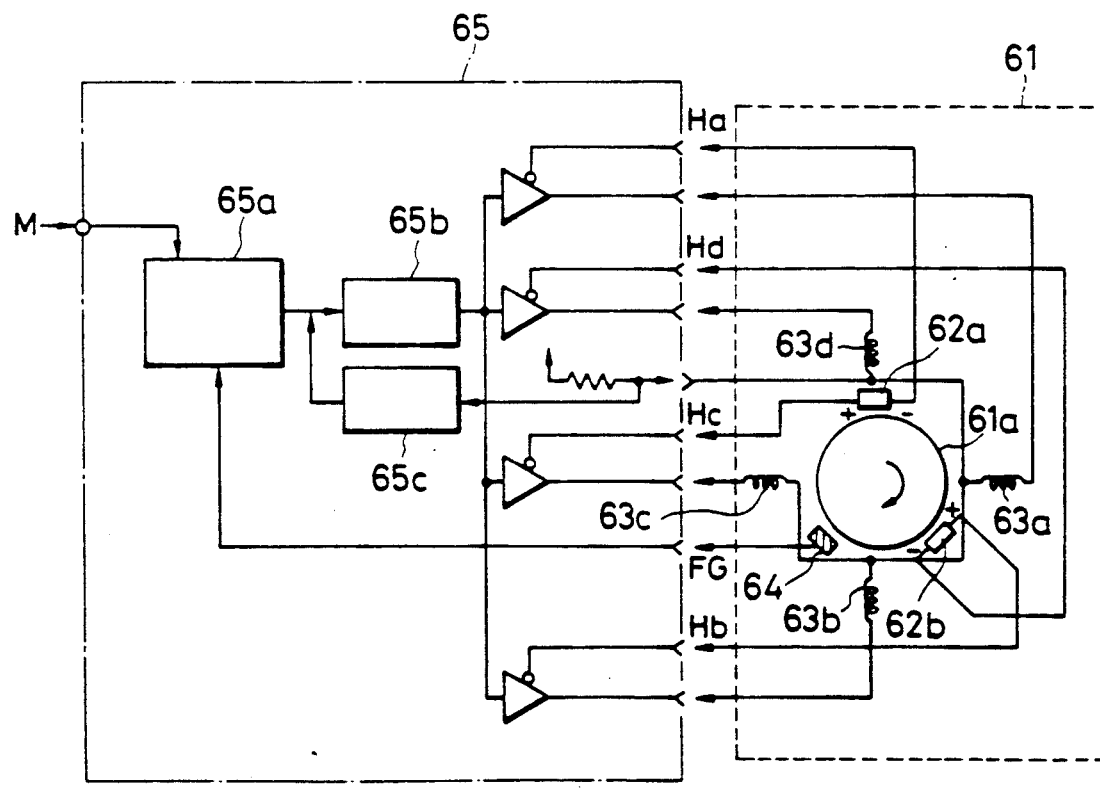
FIGS. 21 and 22 are circuit diagrams showing a scanner motor circuit.
Figure 22:
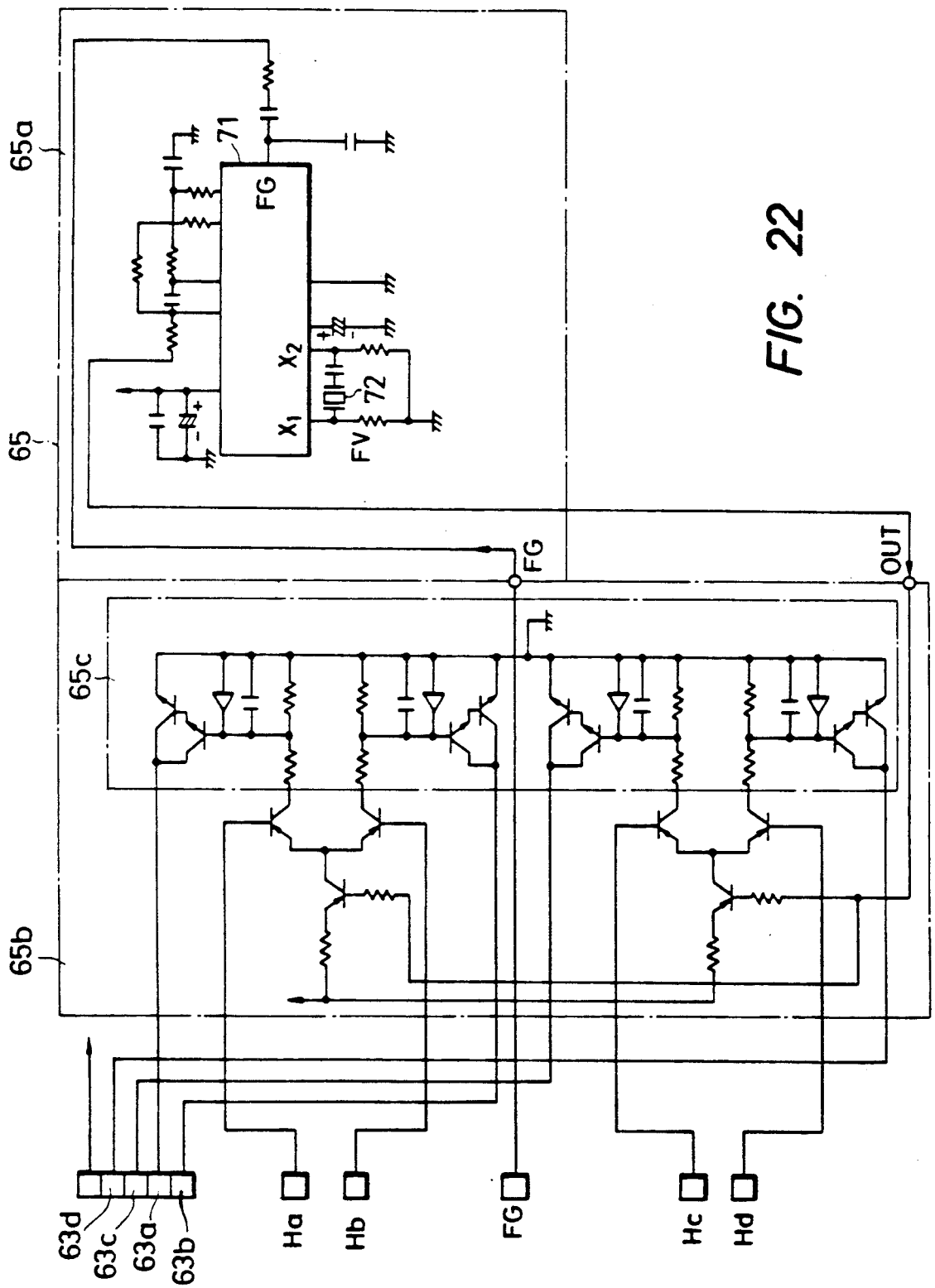

FIGS. 21 and 22 are block diagrams showing a control circuit for a scanner motor 1514 shown in FIG. 19.

A driver circuit 61 is provided with a rotor 61a, composed for example of a permanent magnet, for rotating the polygon mirror 1510. Said rotor 61a is provided with Hall devices 62a, 62b placed at a predetermined angular position of the rotor 61a, for example at 135°. Stators 63a-63d are provided with coils in such a manner that the stators 63a, 63d facing the rotor 61a constitute S poles when the coils of said stators are energized and that the stators 63b, 63c facing the rotor 61a constitute N poles when the coils of said stators are energized. A Hall IC 64 is positioned close to the rotor 61a for feeding a detected frequency signal FG to a control unit 65, which is provided with a PLL control circuit 65a, a current amplifier 65b and a current limiter 65c for controlling the current supplied to the stators 63a-63d based on said frequency signal FG and a drive signal M supplied from an unrepresented CPU. Hall devices 62a, 62b generate a voltage "0" and "1" respectively at the "−" terminal and "+" terminal when an N pole of the rotor 61a approaches, and a voltage "1" and "0" respectively when an S pole approaches.

In a position shown in FIG. 21 where the Hall device 62a faces an N pole, the output Ha becomes "0" to supply a current to the stator 63a. Thus the stator 63a is magnetized as an S pole, which repels the S pole of the rotor 61a and attracts the N pole thereof, thus generating a rotating force in the illustrated direction. As the N pole positioned on the Hall device 62a moves away by the rotation of the rotor 61a, the Hall device 62a loses the electromotive force so that the stator 63a becomes cut off. On the other hand, an S pole of the rotor 61a approaches to the Hall device 62b to shift the output Hb to "0", whereby the stator 63b is energized and magnetized as an N pole which attracts said S pole. In this manner the outputs Ha, Hb, Hc and Hd are shifted to "0" in succession to correspondingly magnetize the stator 63a-63d, thus maintaining the rotation of the rotor 61a.

The rotating speed is detected by the Hall IC 64 positioned close to the rotor 61a, and the detected frequency signal FG is supplied to a revolution control circuit 65 to control the currents to the stators 63a-63d so as to maintain a constant revolution of the rotor 61a. Such rotor 61a is naturally provided for each polygon mirror 1510.

In FIG. 22, a PLL IC 71 (PLL control means) composed for example of a device HA12032 (Hitachi) controls the current supplied to the stators 63a-63d by comparing the frequency signal FG from the Hall IC 64 with a reference frequency signal FV supplied from a reference frequency oscillator 72 composed of a crystal oscillator. Such PLL IC chip 71 is provided for each scanner motor 1514.

In this manner the PLL IC 71 controls the revolution of each scanner motor 1514 in synchronization with the reference frequency signal FV supplied from a corresponding reference frequency oscillator 72, so that the revolutions of the scanner motors 1514 cannot be maintained identical due to the fluctuation of the reference frequency signals FV. Thus the markers have different Y1-Y4 and are suitable for correcting the errors in the image registration. This drawback can however be resolved by employing a common oscillator for supplying the reference frequency signal to different PLL IC's, and automatic correction of the color registration can be achieved by the use of common means for supplying a common reference frequency signal to plural PLL control means.

Figure 23:
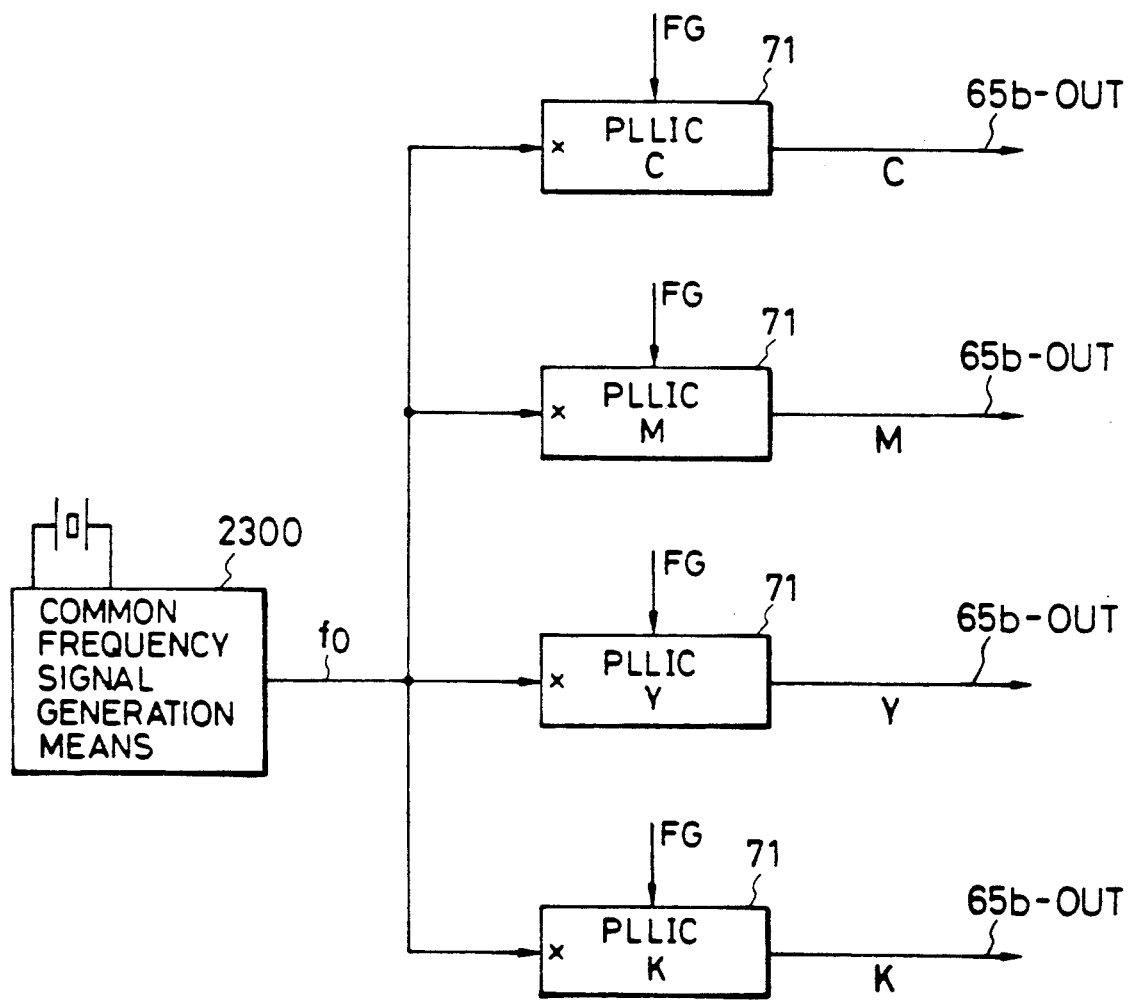
FIG. 23 is a circuit diagram of a phase locked loop control circuit.

FIG. 23 is a circuit diagram of a PLL control circuit for a laser beam printer, employing a common oscillator, wherein same components as those in FIG. 22 are represented by same numbers. Common frequency signal generator 2300 supplies a common reference frequency signal f0 to an input terminal X of the PLL IC 71 of each color.

Each PLL IC 71 controls the revolution of each scanner motor 1514, by comparing the frequency signal FG fed back from each Hall IC with said reference frequency signal f0.

Consequently the PLL IC's 71 provide an identical revolution, thus avoiding the difference in the widths Y1-Y4 of the registration correcting markers.

[2-3] Surface potential control

The form of the registration correcting markers is very important, because the measurement of the error in registration relies on the detection of the edges of the marker. For this purpose the density of the marker has to be maintained constant, and this can be achieved through the surface potential control of the photosensitive drum.

Again referring to FIG. 10, the photo sensitive drum 211, rotated in a direction of arrow, is uniformly charged, with corona discharge, by the primary charger 212 powered by the high-voltage transformer 230. An auto power controller 1004, constituting current control means and current correcting means of the present invention, releases drive current data, for example in the form of 8 bits, for supplying a reference drive current to a laser circuit board 1005 provided with a laser driver circuit 1005a, a D/A converter 1005b and a semiconductor laser 1005c. A power detector 1006, constituting the monitor means of the present invention, detects the light emitting power of the semiconductor laser 1005c of said board 1005, amplifies the obtained power with an amplifier 1006a and supplies the power data through an A/D converter 1006b to a CPU 1004a of the auto power controller (APC) 1004. A laser beam 1007 is projected, from the laser circuit board 1005, onto the exposure point A of the photosensitive drum 211. A potential sensor 1008 measures, at a measuring point B, of the surface potential of said photosensitive drum 211 subjected to the irradiation with the laser beam 1007 at the exposure point A. A potential measuring unit 1009, constituting the potential measuring means of the present invention, converts the output of the potential sensor 1008 into a digital value by an A/D converter 1009a and sends said value to the CPU 1004a of the APC 1004. The developing sleeve 206 receives replenishment of toner by replenishing rollers R1, R2. The conveyor belt 209 is moved in a direction indicated by an arrow, and the registration correcting marker developed on the photosensitive drum 211 is transferred onto said belt 209 by means of the transfer charger 210.

Figure 24:
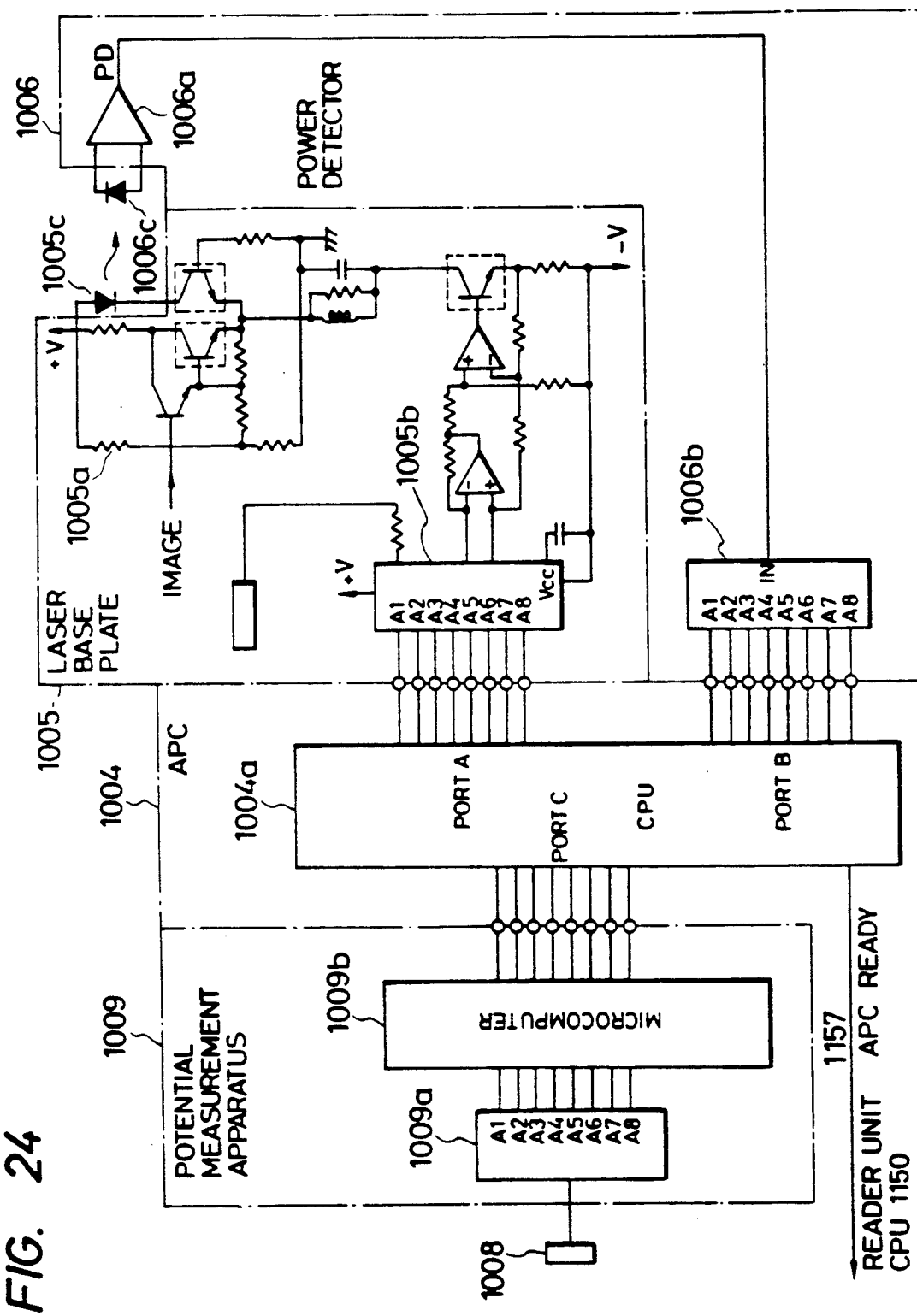
FIGS. 24 and 25 are circuit diagrams of an automatic power control (APC) circuit for laser power.

FIG. 24 is a block diagram of a circuit for surface potential control and auto power control, wherein same components as those in FIG. 10 are represented by same numbers. In the following there will be explained the circuit functions for surface potential control and auto power control with reference to FIGS. 24 and 25, while the control sequence of this circuit will be more detailedly explained later in reference to a flow chart.

Figure 25:
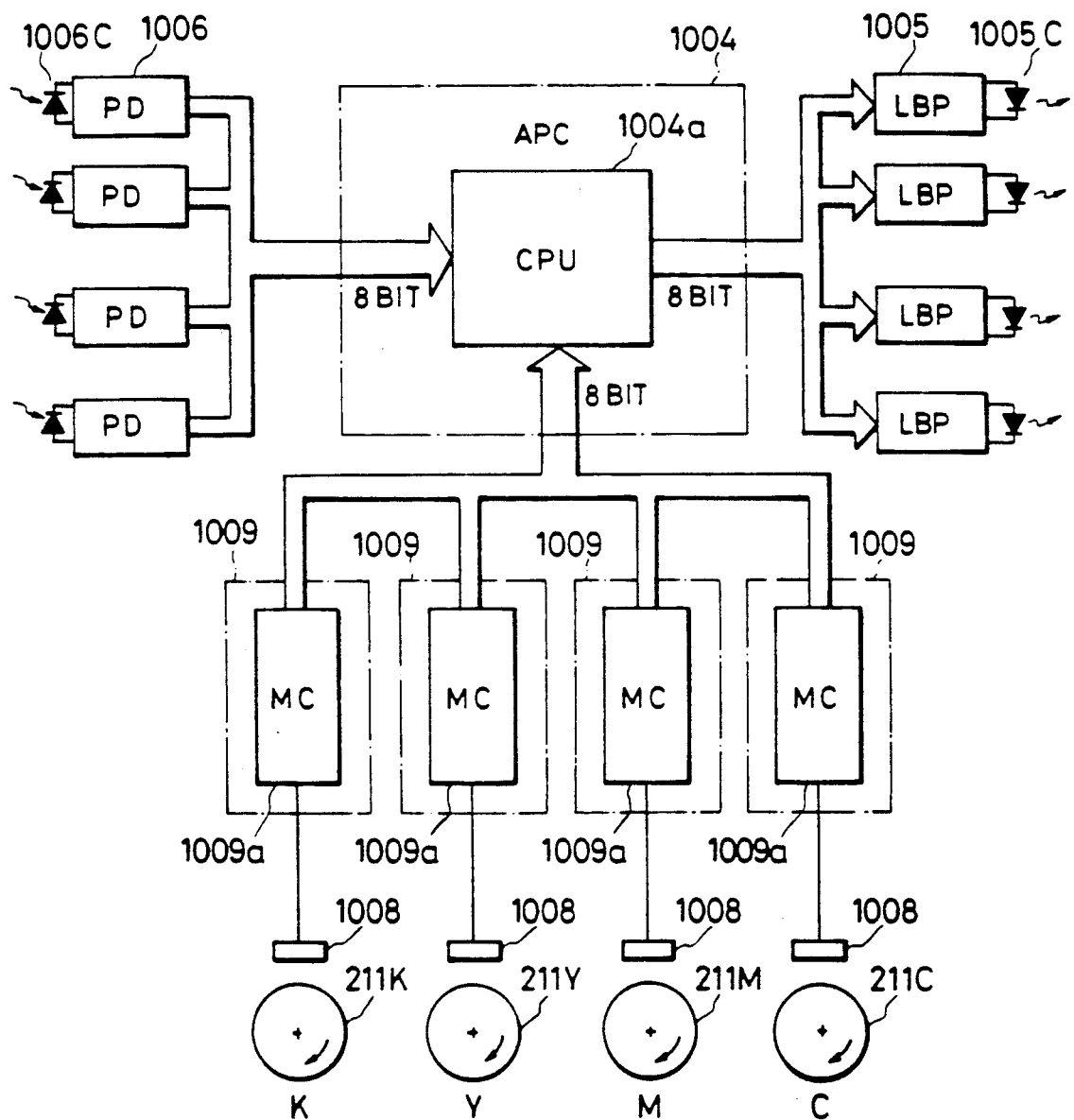

At first, FIG. 24 shows a series of control systems consisting of the potential sensor 1008, A/D converter 1009a, microcomputer 1009b, CPU 1004a of the APC, D/A converter 1005b, laser driver circuit 1005a, semiconductor laser 1005c, photodiode 1006c, amplifier 1006a, A/D converter 1006b and CPU 1004a of the APC. The objective of the auto power control function is to maintain the surface potential of the photosensitive drum at a constant level. This objective is achieved by storing the value measured with the surface potential sensor, and maintaining the light intensity required at this point. In the present embodiment, it is desirable to have centralized control over four photosensitive drums. As shown in FIG. 25, the APC 1004 is connected to four potential measuring units 1009, four laser circuit boards 1005 with respective semiconductor lasers 1005c, and four power detectors 1006 with respective photodiodes 1006c. Consequently the CPU 1004a of the APC can hold all the status relating to the latent image formation.

Figure 26:
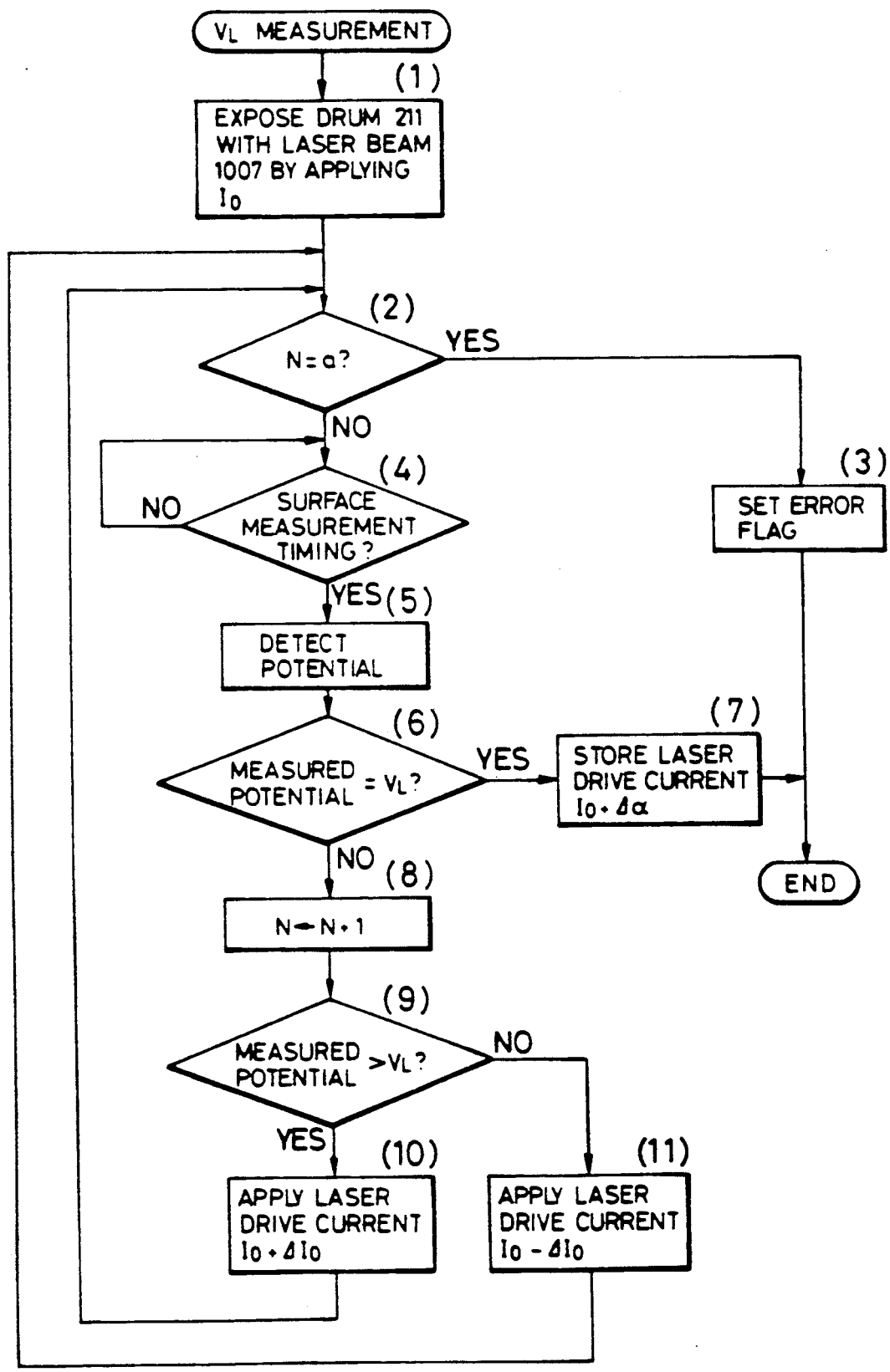
FIGS. 26 and 27 are flow charts showing the control sequence of automatic laser power control.

FIG. 26 is a flow chart showing an example of surface potential measurement, consisting of steps (1) to (11).

At first the photosensitive drum 211 is charged to a surface potential $V_D$ by the primary charger 212. When it reaches the exposure point A, the APC 1004 sends the reference drive current data to the D/A converter 1005b of the laser circuit board 1005 thereby supplying the semiconductor laser 1005c with the reference drive current IO and projecting the laser beam 1007 onto the photosensitive drum 211 (1). Then a discrimination is made as to whether the number N of adjustment has reached a predetermined number a (2), and, if said number is reached, an error flag is set and the control procedure is terminated (3). If not reached, the program awaits that the photosensitive drum 211 reaches the potential measuring point B (4), and the surface potential is detected by the potential sensor 1008 when said point is reached (5). The output of said sensor 1008 is converted by the A/D converter 1009a of the potential measuring unit 1009, and further converted into table data by the microcomputer 1009b. Then a discrimination is made as to whether the measured potential coincides with the desired potential $V_L$ (6), and, if the result is affirmative, the supplied laser drive current (reference drive current $IO+\Delta\alpha$) is stored in an unrepresented memory and the control procedure is terminated (7).

On the other hand, if the discrimination in the step (6) is negative, the number N of measurements is increased by one (8). Then a discrimination is made as to whether the measured potential is higher than the desired potential $V_L$ (9), and, if the result is affirmative, the laser drive current is adjusted to (reference drive current $IO+\Delta IO$) to increase the laser power (10) and the program returns to the step (2). If the result is negative, the laser drive current is adjusted to (reference drive current $IO-\Delta IO$) to decrease the laser power (11) and program returns to the step (2). $\Delta IO$ is the minimum increase or decrease of the current in a control step, and corresponds to a change in the least significant bit (LSB) of the D/A converter 1005b. $\Delta\alpha$ is equal to $\Delta IO$ times the number N of adjustments.

In this manner a laser power P0 corresponding to the surface potential $V_L$ of the photosensitive drum can be generated by a laser drive current (reference drive current $IO-\Delta\alpha$).

Consequently a constant surface potential of the photosensitive drum 211 can be obtained by a constant laser power P0. However the semiconductor laser 1005c of the laser circuit board 1005 is easily influenced by circumferential conditions such as temperature, and the relation between the laser power and the laser drive current is not constant. Therefore, in order to obtain a constant laser power P0, the laser drive current (reference drive current $IO-\Delta\alpha$) should additionally contain a correction $\Delta\beta$ for the change in such ambient conditions. For this purpose the power of the semiconductor laser 1005c is constantly monitored by the power detector 1006c, and the change in power is supplied, through the A/D converter 1006b, to the CPU 1004a of the APC 1004.

Now reference is made to FIG. 25 for explaining the monitored control of the laser power.

Figure 27:
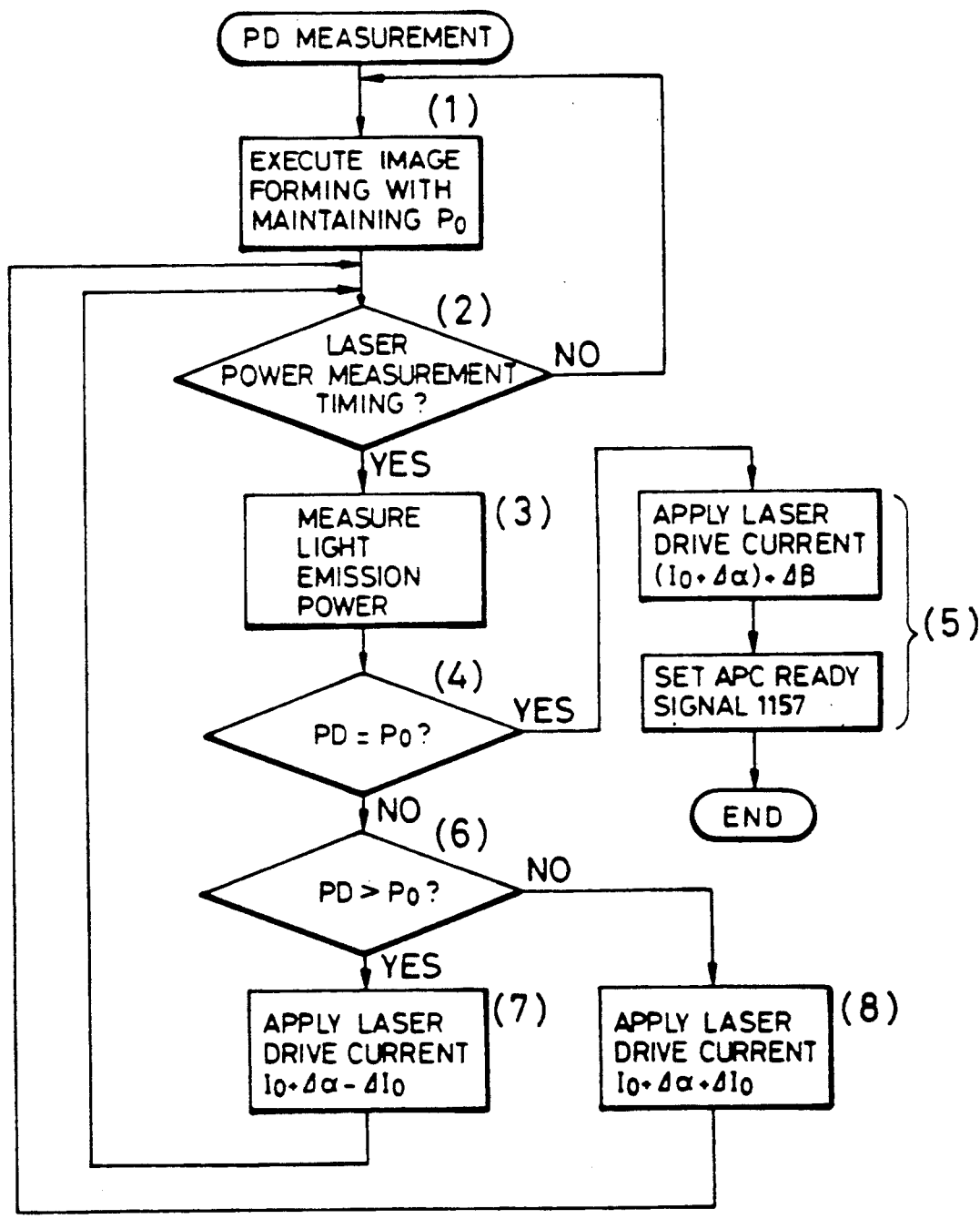

FIG. 27 is a flow chart showing an example of the monitored control laser power, consisting of steps (1) to (8).

At first the image formation is conducted with a laser drive current providing a laser power P0 which gives a surface potential $V_L$ on the photosensitive drum 211 (1). Then the program awaits a non-image area between the recording sheets, or a period for measuring the laser power defined at a predetermined interval (2), and the power of the semiconductor laser 1005c of the laser circuit board 1005 is monitored with the power detector 1006c, amplified by the amplifier 1006a and supplied through the A/D converter 1006b, as power data PD, to the CPU 1004a of the APC 1004 (3). Then there is discriminated whether the power data PD coincides with the initial laser power P0 (4), and, if affirmative, a laser drive current (reference drive current $IO+\Delta\alpha+\Delta\beta$) is supplied to the laser driver circuit 1005a, and the control procedure is terminated by setting an APC ready signal 1157 (5).

On the other hand, if the discrimination in the step (4) turns out negative, there is discriminated whether the power data PD is larger than the initial laser power P0 (6), and, if larger, a laser drive current (reference drive current $IO+-\Delta IO$) is supplied to the laser driver circuit 1005a in order to reduce the laser power (7) and the program returns to the step (2). On the other hand, if smaller, a laser drive current (reference drive current $IO+\Delta\alpha+\Delta IO$) is supplied to the laser driver circuit 1005a in order to increase the laser power (8) and the program returns to the step (2). $\Delta IO$ is the minimum increase or decrease of the current in a control step, and corresponds to a change in the least significant bit (LSB) of the D/A converter 1005b. $\Delta\beta$ is equal to $\Delta IO$ times the number N of adjustments.

The positional error detector 1402, composed for example of a CCD sensor, requires a light source with a stable light intensity, since a fluctuation in the light intensity results in an error in the edge position of the marker when the marker 1501 is illuminated by said light source and is detected by the sensor.

In FIG. 14, the light sources 1603, composed of light-emitting diodes, are respectively associated with constant current circuits 1406 for stabilizing the light intensity. In case the S/N ratio of the registration correcting markers 1501 is insufficient due to the stain on the conveyor belt 209 on which said markers are formed, the light intensities of the light-emitting elements 1603C, 1603M, 1603Y, 1603K have to be increased in mutually balanced state. For this reason a constant voltage circuit 1409 is provided with a variable resistor 1407 for varying the output voltage V0. A power source 1408 is provided for driving said light-emitting elements 1603.

The reading precision of the registration correcting markers 1501 is very important, since the control of color registration is not possible if the reading precision is lower than the resolving power of the color copy. Said reading precision is naturally influenced significantly by the precision of formation of the above-mentioned registration correcting markers 1501, the resolving power of the reading sensors 1402, and the stability or time-dependent change of the relative mounting precision of four CCD sensors. Therefore, this problem can be resolved if four CCD sensors are integrally fixed. A right-hand view in FIG. 16 is a cross-sectional view of the sensor board 1506, wherein shown are a casing 1606; a lamp 1605 for illuminating the registration correcting markers 1501; a CCD sensor 1404; a printed circuit board 1608 for mounting said CCD sensor; and a short-focus lens array 1606. This structure allows to exactly read the markers 1501, thereby improving the precision of the correction.

The CCD sensors 1402 and the illuminating lamp 1605 are influenced by the temperature and humidity over a long time, and such influence can be best compensated by a standard reflecting board 1602, shown in FIG. 16, of for example white color. Such board enables compensation by reading the reference light without substantial influence of the spectral sensitivity of the CCD sensors.

[2-4] Timing correction

Now reference is made to FIGS. 14 and 16 for explaining the timing correction for automatic color registration in the present embodiment.

Figure 28:
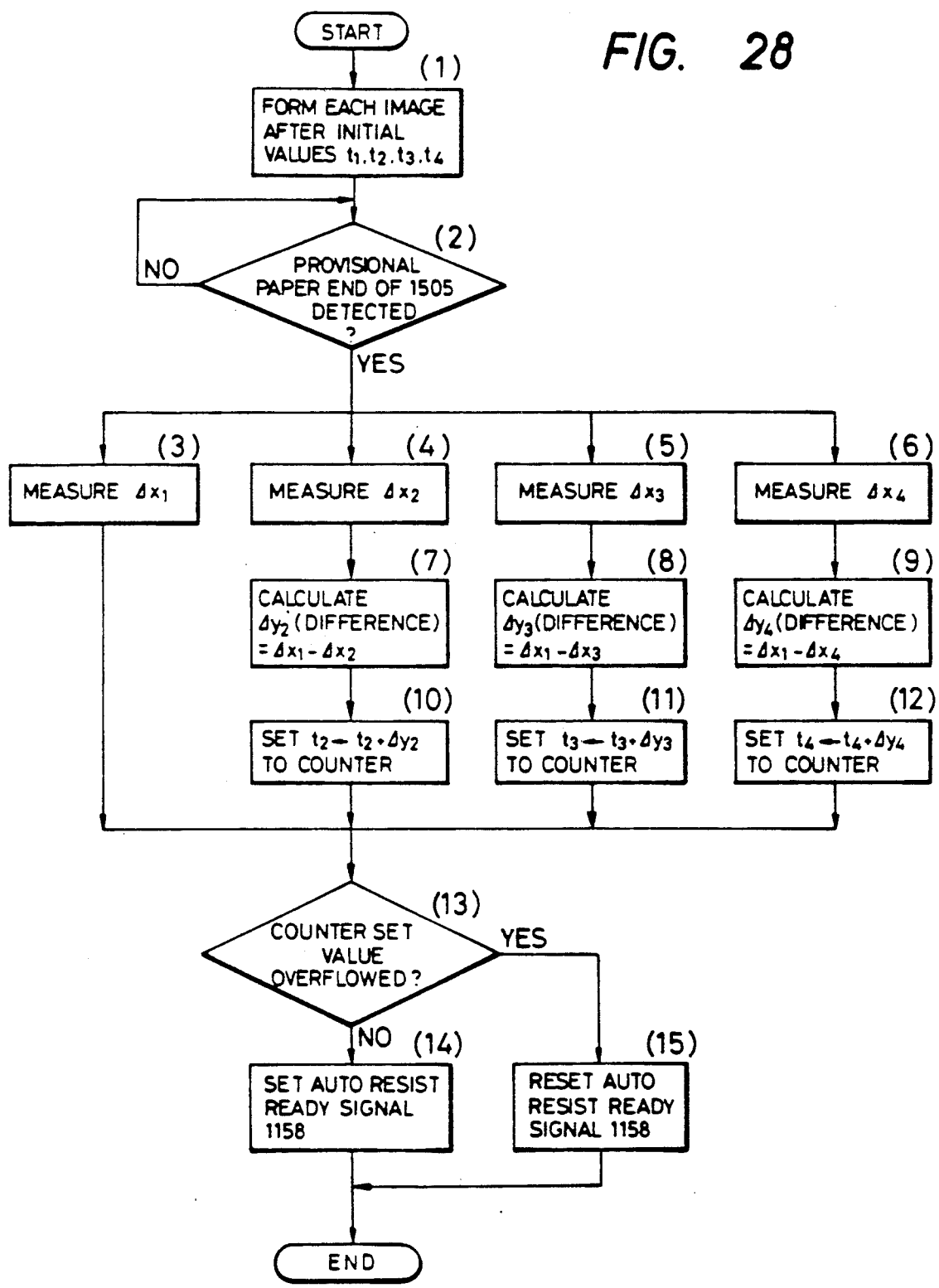
FIG. 28 is a flow chart showing the control sequence of registration control.

FIG. 28 is a flow chart showing the sequence of correcting the timing of image formation of the present invention, consisting of steps (10 to 12).

Referring to FIG. 14, the CPU 1401 sets initial values in the counters 1403a–1403d, in order to start the formation of the correcting markers 1501C–1501K on the conveyor belt 1505 after the lapse of respective initial values t1–t4. This corresponds to a step (1) in FIG. 28.

As already explained before, FIG. 16 shows a state in which all the correcting markers are formed. The belt 1505 serves as the conveyor belt and is formed as an endless belt, and the correcting markers are formed on said belt. Thus relative errors in color registration have to be determined as differences from a certain reference time. In the present embodiment said reference time is defined by the front end of an imaginary recording sheet. The program awaits the detection of the front end of the imaginary sheet on the belt 1505 shown in FIG. 16 by any of the detectors 1402C–1402K (2), and, upon said detection, an unrepresented timer circuit measures the time $\Delta x1$, $\Delta x2$, $\Delta x3$ and $\Delta x4$ to the detection of the markers 1501C–1501K and stores said time in an internal memory (steps (3)–(6)). Then the relative differences from $\Delta x1$ are determined as $\Delta y2 = \Delta x1 - \Delta x2$, $\Delta y3 = \Delta x1 - \Delta x3$ and $\Delta y4 = \Delta x1 - \Delta x4$ (steps (7) to (9)). Then thus obtained time differences $\Delta y2$, $\Delta y3$ and $\Delta y4$ and the times t2, t3 and t4 are used for calculating corrected times $t2 + \Delta y2$, $t3 + \Delta y3$ and $t4 + \Delta y4$, which are set in the counters 1403a–1403d (steps (10) to (12)). Then there is checked whether the values set in the counters 1403a–1403d are within the correctable range (13). If said values are within said range, the automatic registration signal 1158 is set as the automatic correction is possible (14). On the other hand, if said values are not in said range, said signal is reset.

In the illustrated case, the correcting marker for the cyan image is detected at first, and is used for calculating the differences, but any other marker that is detected at first may naturally be used as reference in the same manner.

The foregoing embodiment is limited to a color printer provided with plural electrophotographic photosensitive drums, but the present invention is also applicable to other printers, such as a thermal transfer printer in which a multiple image is formed by forming different images respectively on different recording materials and transferring said images onto a same recording medium.

As detailedly explained in the foregoing, the present invention allows to obtain a multiple image without error in image registration or a color image without error in color registration. Also it enables high-speed formation a color or multiple image.

The present invention is not limited to the foregoing embodiment but is subject to various modifications and variations within the scope and spirit of the appended claims.

What is claimed is:

1. A multiple image forming apparatus comprising:
   means for generating color signals;
   memory means for storing data corresponding to the color signals;
   image forming means for forming images on plurality recording members, said plural recording members being aligned in a subscan direction; and
   control means for controlling a data read operation from said memory means such that positional aberration of the images in the subscan direction is corrected, the images being formed by said image forming means,
   wherein said image forming means transfers the images on each of said recording members onto a common recording medium.

2. An apparatus according to claim 1 wherein said generating means comprises a color image reader which reads an original.

3. An apparatus according to claim 1, wherein said memory means stores therein the data obtained through data-compression of the color signals.

4. An apparatus according to claim 1, wherein each of said plural recording members comprises a photosensitive drum.

5. A multiple image forming apparatus comprising:
   means for generating color signals
   memory means for storing data corresponding to the color signals;
   plural image forming means for forming images on plural recording members, said plural recording members being aligned in a subscan direction, said plural image forming means performing the image forming by canning said recording members using a radiation beam, and each of said plurality image forming means comprising first detection means for detecting a scanning position of said radiation beam;

second detection means for detecting mutual positional aberration of the images formed by said plural image forming means; and plural signal reading means respectively provided in correspondence with said plural image forming means, for reading the data stored in said memory means in accordance with both the scanning position detected by said first detection means and the positional aberration detected by said second detection means and supplying the read data to said corresponding image forming means.

6. An apparatus according to claim 5, wherein said generating means comprises a color image reader which reads an original.

7. An apparatus according to claim 5, wherein said memory means stores therein the data obtained by data compression of the color signals.

8. An apparatus according to claim 5, wherein each of said plural recording members comprises a photosensitive drum.

9. An apparatus comprising:
first generation means for generating a first color image signal representative of an objective image;
color compression means for color-compressing the color image signal;
memory means for storing the compressed color image signal;
coloring image formation means for forming images on a recording medium;
supply means for expanding the color image signal stored in said memory means to supply the expanded color image signal to said color image formation means; and
second generation means for generating, independently of said first generation means, a second color image signal to be stored into said memory means.

10. An apparatus according to claim 9, wherein said first generation means comprises a color image reader for reading an original.

11. An apparatus according to claim 9, wherein said color compression means separates the color image signal into a chromaticity component and a lightness component.

12. An apparatus according to claim 9, wherein said color image formation means includes a photosensitive drum.

13. An apparatus according to claim 9, wherein said color image formation means operates electrophotographically.

14. An apparatus comprising:
common memory means for storing a color image signal representative of an objective color image;
a plurality of image formation means, each of said plurality of image formation means generates a respective color;
a plurality of read means, respectively provided in correspondence with said plurality of image formation means, for reading the color image signal from said common memory means; and
transfer means for multi-transferring images formed by said plurality of image formation means.

15. An apparatus according to claim 14, wherein said common memory means stores the color image signal and separates the color image signal into a chromaticity component and a lightness component.

16. An apparatus according to claim 15, wherein said plurality of read means comprises extraction means for extracting from the chromaticity and lightness components a color component for the color to be generated by said image formation means.

17. An apparatus according to claim 14, wherein said common memory means stores color image signal as a compressed image signal.

* * * * *

UNITED STATES PATENT AND TRADEMARK OFFICE
CERTIFICATE OF CORRECTION

PATENT NO. : 5,099,260
DATED : March 24, 1992
INVENTOR(S) : YUKIO SATO ET AL.

It is certified that error appears in the above-identified patent and that said Letters Patent is hereby corrected as shown below:

TITLE PAGE:
AT [56] REFERENCES CITED

U.S. Patent Documents, insert
--4,467,348  8/1984  Fuji et al. .....358/78--.

TITLE PAGE:
AT [57] ABSTRACT

Line 5, "supperposed" should read --superposed--.

IN THE DRAWINGS:
SHEET 16 OF 25

FIG. 18, "RESIST" (both occurrences) should read --REGISTRY-- and "MARKER FORM" (all occurrences) should read --MARK FORMATION--.

COLUMN 1

Line 30, "machines" should read --machine--.

COLUMN 2

Line 17, "abovemen-" should read --above-men- --.

COLUMN 3

Line 13, "of" should be deleted.

UNITED STATES PATENT AND TRADEMARK OFFICE
CERTIFICATE OF CORRECTION

PATENT NO. : 5,099,260
DATED : March 24, 1992
INVENTOR(S) : YUKIO SATO ET AL.

It is certified that error appears in the above-identified patent and that said Letters Patent is hereby corrected as shown below:

COLUMN 4

Line 17, "signal L*, a*, b*" should read --signals L*, a*, b*--.
Line 47, "[1-3]Reader" should read --[1-3] Reader--.
Line 67, "are" should be deleted.

COLUMN 5

Line 6, "Pulley 133," should read --pulley 133,--.
Line 35, "sub scanning" should read --sub-scanning--.
Line 65, "or" should read --for--.

COLUMN 7

Line 11, "(AO-said A19)" should read --(AO-A19)--.
Line 45, "foregoing, the" should read --foregoing.  The--.

COLUMN 8

Line 56, "cause" should read --caused--.
Line 64, "11Y" should read --211Y--.

COLUMN 9

Line 9, "τis" should read --τ is--.

COLUMN 11

Line 56, "AND agtes" should read --AND gates--.

UNITED STATES PATENT AND TRADEMARK OFFICE
CERTIFICATE OF CORRECTION

PATENT NO. : 5,099,260
DATED : March 24, 1992
INVENTOR(S) : YUKIO SATO ET AL.

Page 3 of 4

It is certified that error appears in the above-identified patent and that said Letters Patent is hereby corrected as shown below:

COLUMN 12

Line 14, "sub scanning" should read --sub-scanning--.
Line 28, "+Δ|y2|)," should read --+|Δy2|),--.
Lines 29-30, "Thus, in the image formation." should be deleted.
Line 34, "units 201M," should read --units 201C, 201M,--.

COLUMN 13

Line 52, "stator 63a-63d," should read --stators 63a-63d,--.

COLUMN 14

Line 8, "Y1-Y4" should read --widths Y1-Y4--.
Line 38, "photo sensitive" should read --photosensitive--.
Line 58, "of" (first occurrence) should be deleted.

COLUMN 16

Line 49, "current IO+-ΔIO)" should read --current IO+Δα-ΔIO)--.

COLUMN 17

Line 65, "=Δx1-Ax2," should read --Δx1-Δx2,--.

UNITED STATES PATENT AND TRADEMARK OFFICE
CERTIFICATE OF CORRECTION

PATENT NO. : 5,099,260
DATED : March 24, 1992
INVENTOR(S) : YUKIO SATO ET AL.

Page 4 of 4

It is certified that error appears in the above-identified patent and that said Letters Patent is hereby corrected as shown below:

COLUMN 18

Line 25, "formation" should read --formation of--.
    Line 35, "plurality" should read --plural--.
    Line 64, "canning" should read --scanning--.
    Line 65, "plurality" should read --plural--.

COLUMN 20

Line 18, "generates" should read --generating--.
    Line 36, "stores color" should read --stores the color--.

Signed and Sealed this

Seventh Day of September, 1993

Attest:

BRUCE LEHMAN

*Attesting Officer*  *Commissioner of Patents and Trademarks*